US006552830B2

(12) United States Patent
Long

(10) Patent No.: US 6,552,830 B2
(45) Date of Patent: Apr. 22, 2003

(54) HOLOGRAPHIC AUTHENTICATION ELEMENT AND DOCUMENT HAVING HOLOGRAPHIC AUTHENTICATION ELEMENT FORMED THEREUPON

(75) Inventor: Michael D. Long, Santa Cruz, CA (US)

(73) Assignee: Pacific Holographics, Inc., Santa Cruz, CA (US)

(*) Notice: Subject to any disclaimer, the term of this patent is extended or adjusted under 35 U.S.C. 154(b) by 0 days.

(21) Appl. No.: 09/802,714

(22) Filed: Mar. 8, 2001

(65) Prior Publication Data

US 2001/0013959 A1 Aug. 16, 2001

Related U.S. Application Data

(63) Continuation of application No. 09/388,309, filed on Sep. 1, 1999, now Pat. No. 6,222,650, which is a continuation of application No. 08/738,767, filed on Oct. 28, 1996, now Pat. No. 5,986,781.

(51) Int. Cl.⁷ .................................................. G03H 1/00
(52) U.S. Cl. ............................................. 359/2; 359/10
(58) Field of Search .............................. 359/2, 10, 567; 349/201, 2, 4; 283/86; 355/2, 67, 71

(56) References Cited

U.S. PATENT DOCUMENTS

| | | | |
|---|---|---|---|
| 4,104,489 A | 8/1978 | Satoh et al. ............. 179/100.3 |
| 4,832,445 A | 5/1989 | Haines et al. ................... 359/2 |
| 4,878,717 A | 11/1989 | Gerritsen ....................... 359/9 |
| 4,964,684 A | 10/1990 | Iovine .......................... 359/23 |
| 4,984,824 A | 1/1991 | Antes et al. .................... 283/91 |
| 4,989,071 A | 1/1991 | Hopwood ....................... 358/2 |
| 5,032,003 A | 7/1991 | Antes ..................... 350/162.18 |
| 5,119,214 A | 6/1992 | Nishii et al. .................... 359/7 |
| 5,138,604 A * | 8/1992 | Umeda et al. .............. 369/103 |
| 5,142,383 A * | 8/1992 | Mallik ........................... 359/2 |
| 5,187,600 A | 2/1993 | Sato ............................. 359/41 |
| 5,262,879 A | 11/1993 | Davis .......................... 359/10 |

(List continued on next page.)

FOREIGN PATENT DOCUMENTS

| WO | 96/10776 | 4/1996 |
| WO | 97/16772 | 5/1997 |

Primary Examiner—Cassandra Spyrou
Assistant Examiner—Alessandro V. Amari
(74) Attorney, Agent, or Firm—R. Michael Ananian; Dorsey & Whitney LLP

(57) ABSTRACT

Device, method, and system for recording diffractive high resolution text, pictorial, and/or other graphical information is provided which is particularly suited to recording information that would be difficult to reproduce by typical counterfeiting methods. The information recorded may be used to authenticate the recorded item, or indirectly, an item to which the recording is attached. Such items may include legal, financial and commercial instruments, credit cards, and packaging for such items as software, art, and other items where forgery of the item may be a concern. In one embodiment of the invention light is selectively passed by a shutter, and a spatial filter then cleans the beam to remove undesirable frequency components. A liquid crystal display (LCD) dynamically receives a data stream from a computer where each of the displayed data values presents an optical characteristic (for example density, phase, or polarization) to the filtered beam and causes diffraction into a plurality of diffracted beams, the character of which is dependent on the data displayed. A mask selectively passes only predetermined ones of the beams so that only frequency components that will generate the desired optical interference fringes are allowed to pass. Additional optical components receive the passed beams and redirect them to overlap at an output plane to form interference fringes. These interference fringes can have a very high spatial frequency so that extremely fine lines or small objects, including text and graphics, can be recorded.

24 Claims, 11 Drawing Sheets

U.S. PATENT DOCUMENTS

| | | | |
|---|---|---|---|
| 5,267,753 A | 12/1993 | Chock | 283/58 |
| 5,291,027 A | 3/1994 | Kita et al. | 250/566 |
| 5,291,317 A | 3/1994 | Newswanger | 359/15 |
| 5,428,479 A | 6/1995 | Lee | 359/567 |
| 5,455,129 A * | 10/1995 | Bussard | 430/1 |
| 5,515,183 A | 5/1996 | Hashimoto | 359/9 |
| 5,539,543 A | 7/1996 | Liu et al. | 359/15 |
| 5,589,955 A | 12/1996 | Amako et al. | 359/9 |
| 5,801,857 A | 9/1998 | Heckenkamp et al. | 359/2 |
| 5,856,048 A | 1/1999 | Tahara et al. | 430/1 |

* cited by examiner

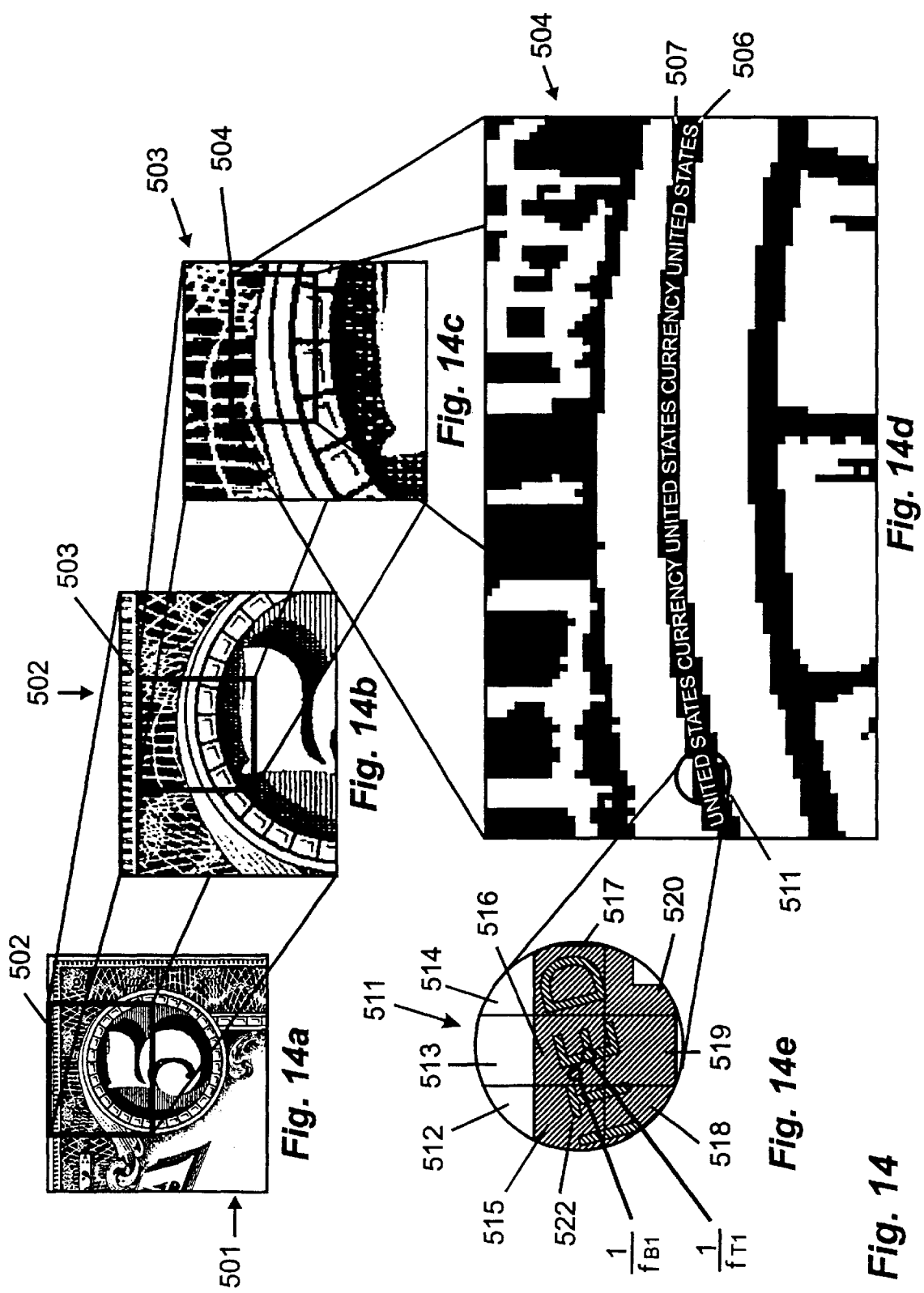

HOLOGRAPHIC AUTHENTICATION ELEMENT AND DOCUMENT HAVING HOLOGRAPHIC AUTHENTICATION ELEMENT FORMED THEREUPON

This is a continuation of application Ser. No. 09/388,309 filed Sep. 1, 1999 now U.S. Pat. No. 6,222,650, which is a continuation of application Ser. No. 08/738,767 filed Oct. 28, 1996, now U.S. Pat. No. 5,986,781.

FIELD OF THE INVENTION

This invention pertains generally to the field of optical diffraction methods and apparatus, and more specifically to the field of apparatus and methods for generating high-resolution diffractive elements and holographic images.

BACKGROUND

Apparatus and methods for generating and interrogating holograms and other optical diffractive devices have been known since the early 1960's however such devices were largely sophisticated laboratory research tools. More recently, the advent of high resolution color photocopying, digital scanning, and image processing have made counterfeiting documents incorporating only 2-dimensional information much simpler. Holograms and other media capable of storing 3-dimensional information have become increasingly important in preventing counterfeiting and assuring the authenticity of documents and items attached to such documents. For example, it is common for Visa and MasterCard type credit cards to include an embossed "rainbow" hologram on the front of the card. Computer software developers including Lotus Development Corporation, Microsoft Corporation, and others have included a holographic label on their product packaging to help distinguish their product from a potential unauthorized reproduction of their product. It is also anticipated that commercial instruments, including stock certificates, currency, and other negotiable financial instruments, may someday benefit from the inclusion of holographic indicia on the instrument itself.

The incorporation of holographic security devices, such as the holograms built into credit cards and fused to negotiable instruments, as well as applications to currency, raises a need for high quality holograms that cannot easily be counterfeited and that can be produced quickly and cheaply in volume to reduce the cost per hologram or diffraction grating. High resolution holographic grating array masters are currently produced using E-Beam techniques and are therefore relatively expensive and slow to manufacture. Other methods of producing lower resolution grating arrays have become commonplace enough to threaten their potential usefulness in the field of security. Therefore, there is a need for high resolution but inexpensive gratings that cannot easily be produced by counterfeiting.

Holographic diffraction grating arrays have been manufactured since as early as 1980. In the last few years, high resolution grating arrays have found a new use in the security field as anti-counterfeiting devices. The technologies used in the manufacture of these arrays include holographic recording of spot diffraction gratings and E-Beam etching of the holographic grating fringe structure itself.

Conventional holographic systems extant at this time seem to be limited to spot sizes and therefore feature sizes on the order of 1/400 inch (about 60 microns). Even at this relatively large feature size, the recording of large array areas with conventional techniques can be prohibitively slow (and therefore expensive) since each image pixel typically requires individual motion of the film platen and subsequent exposure. These conventional systems are also generally limited to fixed spatial frequencies, or at best to a predetermined set of fixed spatial frequencies, which limits the type of imagery or graphical information they are capable of recording. There are also quite a number of such systems in operation at this time, a situation which seriously limits their credibility and utility in the field of security.

E-Beam writing of grating arrays which is capable of high resolution, is so prohibitively expensive a process and requires such a large capital investment that it's utility in anti-counterfeiting is secure. It is not seriously limited as to feature size as each fringe of any desired grating array can be written individually. Unfortunately, the production of relatively small grating arrays requires a considerable amount of time on extremely expensive equipment. As with the invention described herein, clever programming is also necessary to take full advantage of such as system. E-Beam recording techniques also require relatively sophisticated equipment control and computer control techniques to achieve the desired output.

To date there seems to be no system extant capable of producing inexpensive, large area, high resolution, grating arrays. Therefore, it is clear that there is a need for system, apparatus, and method that provide solutions to these limitations in the prior art.

In one aspect the invention provides means for controlling the shape of the exposure area in a very accurate and precise manner, and to generate final images that contain microscopic two-dimensional image data such as text or other graphical art, where such data can be unique for each exposure area.

In another aspect the invention provides means for representing features in greater detail than provided in conventional systems.

In another aspect the invention provides means for controlling the shape of each output exposure footprint.

In yet another aspect the invention reduces pixelation, quantization, or stair stepping and the rough edges which result from pixel quantization in the final output image so that the output image follows the actual contours in the macroscopic image.

In another aspect the invention provides means for adjusting the output grating spatial frequencies and spatial orientations at will, including presenting or altering the frequencies and orientations continuously and in real-time during operation of the apparatus.

In another aspect the invention provides means for modifying or controlling the spatial frequencies during operation without changing the optical configuration.

In another aspect the invention provides means for generating a multitude of diffractive patterns rapidly, with the potential for generating the diffractive patterns in real time.

In another aspect the invention eliminates moving parts in the optical system and to thereby increase speed and provide greater stability.

In another aspect the invention provides means for more readily maintaining system alignment than would be provided in conventional two beam configurations, or configurations involving mirrors or prisms.

In another aspect the invention provides means for generating diffractive areas which are smaller than have been realized with conventional systems.

In another aspect the invention provides means for forming multi-directional gratings in a single exposure.

In another aspect the invention provides means for accurately and precisely controlling diffraction efficiency by modifying the contrast of the image displayed on the image display device.

In yet a further aspect the invention provides means for using system noise characteristics (including noise introduced by the optical system and image display device imperfections) to uniquely identify the system from which a particular hologram or grating was produced, as a security feature to verify the hologram or grating authenticity.

In another aspect the invention provides means for generating holograms having even exposure density across the entire hologram and for eliminating the Gaussian pits that are typically present in conventional systems which use a focussed narrow beam, by providing a filtered and expanded beam to illuminate the image display device.

In another aspect the invention provides a system permitting rapid photographic exposure by reducing settling times typically required in conventional systems having moving optical components and hence vibration, and by providing a large exposure footprint even for small pixel dimensions, and for providing means for exposing multiple angles in the same exposure footprint simultaneously.

These and other features and advantages are provided by the present invention as will be readily apparent in light of the accompanying drawings and detailed description.

BRIEF DESCRIPTION OF THE DRAWINGS

FIG. 14 is a diagrammatic illustration, somewhat schematic, showing a simulation of imbedded microtext or micrograhic including diffractive fringes within the microtext in a section of printed currency prepared in accordance with an embodiment of the present invention.

SUMMARY OF THE INVENTION

Figure 1:
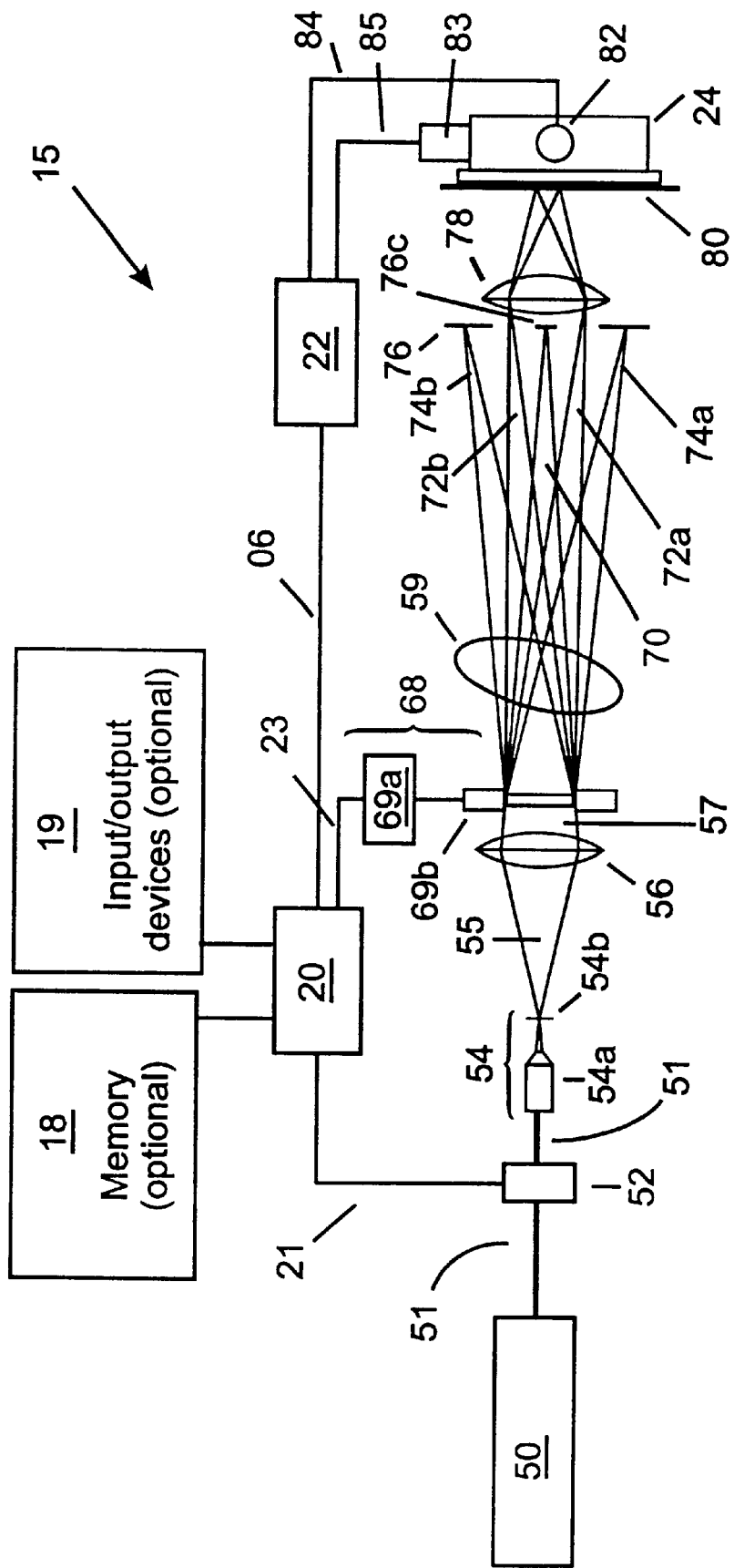
FIG. 1 is a diagrammatic illustration, somewhat schematic, of a first exemplary embodiment of the inventive apparatus.

This invention is directed to a device, method, and system for recording very high resolution text, pictorial, and/or other graphical information on a recording medium. It is particularly suited to recording information that would be difficult to reproduce by typical counterfeiting methods which do not achieve the resolution of the present invention, such that some of the information recorded may be used to authenticate the recorded item or indirectly, the item to which the recorded item is attached. Such items may include but are not limited to currency, official documents, legal, financial and commercial instruments, credit cards, and packaging for such items as software, art, and other items where forgery may be a concern.

In one embodiment of the invention an electromagnetic radiation such as visible light generated by a radiation source (such as a laser) is received by a shutter or other control device for selectively passing or blocking passage of the received light. A spatial filter cleans the beam to generally remove undesirable frequency components and generates a diverging beam with the desired spatial frequency content. A display, preferably a liquid crystal display (LCD) dynamically receives a data stream such as may be generated on a computer, either in real time, or prestored and downloaded or otherwise communicated to the display when required. The data includes a plurality of data values and a corresponding plurality of spatial location values for each the data value for presenting the data values at the corresponding spatial locations in a two dimensional data array of picture elements on the LCD. Each of the displayed data value presenting an optical characteristic related to the corresponding data value in the path of the received converging illumination beam. The optical characteristic is typically either an optical density which alters the amplitude of the light transmitted through a particular pixel of the LCD, or an optical polarization change, such as may result from a birefringence, in the LCD pixel. The presence of the two-dimensional array of optical density or polarization causing diffraction of the incident radiation into a plurality of diffracted beams each the beam having a particular diffracted angle relative to a plane of the display and particular spatial frequency components. A mask receiving the plurality of diffracted beams and selectively passes first predetermined ones of the beams and selectively blocks second ones of the beams different from the first ones so that only the desired frequency components that will generate the optical interference fringes are allowed to pass to an output plane. Additional optical components receive the first beams and redirecting them to overlap in the output plane, the overlap resulting in the formation of interference fringes related to relative phase difference between the overlapping beams. These interference fringes may have a very high spatial frequency so that extremely fine lines or small objects, including text and graphics, can be recorded.

The inventive method for recording a diffractive element such as a diffraction grating or hologram includes generating a first data set representative of a two-dimensional diffraction grating having particular diffraction characteristics, communicating the stored first data set to an LCD display, allowing a beam of radiation such as light to impinge on the LCD in a predetermined manner for a predetermined period of time such that the incident beam is diffracted by the LCD diffraction pattern, optically collecting and redirecting selected components of the diffracted radiation to overlap at a predetermined output focal plane to thereby interfere and generate interference fringes; and recording or otherwise detecting the interference fringes at the output focal plane. The method may also include repeating the process for a plurality of data set representations; and spatially combining each the fringe representations into a final hologram. The invention also includes devices or structures made or recorded according to the methods disclosed herein.

Various embodiments of the device, structure, and method are described that have particular advantages that are addressed in the detailed description of the invention.

DETAILED DESCRIPTION OF THE INVENTION

The inventive apparatus, system, and method provide structure and procedure for rapidly generating high resolution diffraction grating arrays including holograms with fringe structures of about one micron or smaller and discernable image features on the order of about six microns or smaller.

These arrays may be produced in a photo-sensitive etch-resistant material or on other high resolution photo-sensitive materials such as the fine grain silver halide emulsions or other conventional photo sensor materials currently used in holography and micro lithography. The output images may be used for many purposes including anti-counterfeiting, product verification, security badges, decoration, binary optics, and other optical, security, and decorative applications. The invention is now described in detail relative to the appurtenant drawings.

With reference to FIG. 1, there is shown an exemplary first embodiment of the inventive apparatus. In this embodiment a laser 50 emits a beam of light 51 from a laser exit aperture. Laser 50 may be a laser of any conventional type commonly used for holography emitting a wavelength of light (or other electromagnetic radiation) to which the sensitive material in emulsion of choice is sensitive. A filtered incoherent or quasi-coherent light source may also be used in place of a coherent laser since the difference in path length for the two recording beams is typically less than 100 microns; however, a coherent source generally is preferred.

The laser beam 51 is intercepted by shutter 52 which receives control signals to open and close the shutter in response to signals 21 received from computer 20. Computer 20 may be any conventional computer such as personal computer than incorporates Intel, AMD, Cyrix, or Motorola microprocessor for controlling peripheral devices, such as shutter assembly 52, X-Y stage positioned control means such as stepping motors 82 and 83, and for providing data to the LCD display 68 including display controller 68b. The display controller 68b may be a separate device and power supply, or may be incorporated into computer 20, either as an integral part of the processor or as an add in printed circuit (PC) board, or the like. Conventional display controller boards are suitable, such as for example, the LCD display controller made by QAI. It should be understood that the LCD display 68 provides means for displaying data in a two-dimensional array. Other devices such as a spatial light modulator, a reflective micro-mirror, and devices having appropriate real-time or near real-time data switching and optical characteristics may alternatively be used as the data display means in place of an LCD.

When shutter 52 is open, beam 51 passes through the shutter assembly 52 aperture to spatial filter assembly 54. Spatial filter assembly 54 includes an optical system typically implemented by a microscope objective 54a or conventional construction and a pinhole aperture 54b also of conventional variety. The microscope objective 54a receives the raw laser beam 51 from the laser and focuses it to a point coincident with the plane of pinhole 54b. Pinhole 54b is a round aperture sized to perform spatial filtering of the beam in that plane. Other spatial filter means known in the art may alternatively be used.

In the exemplary embodiment shown in FIG. 1, microscope objective 54a has a magnification (such as when used for normal microscope applications) of about 10×. Pinhole 54b is selected in conjunction with microscope objective 54a, and will typically have a round aperture of between about 10 microns and about 25 microns; however, a larger aperture such as a 50–100 microns or larger aperture may be used where filtered beam uniformity is not as critical and greater optical throughput is desirable.

The output beam 55 diverges as it exits pinhole 54b and expands to partially fill a first lens 56 which images the spatial filter pinhole aperture 54b at an intermediate focal plane 75. First lens 56 intercepts the expanding beam 55 to generate a converging beam 57 and refocuses the converging beam through the full aperture of liquid crystal display (LCD) 68. While the focal length of the lens in particular, and dimensions of the apparatus in general, will depend on a particular implementation of the apparatus; in a first exemplary embodiment of the apparatus, the first lens 56 has a diameter of about 60 mm and a focal length of about 250 millimeters. It should be understood that the optical system must generally be scaled depending upon the choice of LCD module 68 dimensions and first focussing lens 56 to achieve the particular desired imaging goals.

LCD 68 may generally be of conventional design, but should have the contrast and resolution characteristics appropriate to provide the desired diffraction characteristics include angular deviation and efficiency. The LCD module 68 generally comprises an electronic driver and controller component 68b with an integral or separate power supply, and a substantially transparent display component having a display area or aperture 68a, which is controlled by the driver section 69b in conjunction with computer 20 to provide desired transparency (clear) and opacity (black or multi-level grey-scale) characteristics as a function of information data signals 23 received over wires from computer 20.

An "active-matrix" type LCD display is preferred because of the high contrast, and high-data switching speeds, although so called "passive" type LCD displays may be used with a possible resultant loss of contrast. In general passive displays may require longer exposure times or a more powerful light source 50 than active matrix displays. Active matrix LCDs of conventional variety typically achieve contrast ratios on the order of between about 100:1 and about 200:1 or more, while so called "passive" displays achieve contrast ratios on the order of between about 10:1 and about 40:1, more typically about 20:1. Conventional LCDs may incorporate polarizing sheets adhered to each side of the display. Color LCDs may be used however they are not preferred because they typically employ color filters which are not advantageously used here.

For applications of these LCDs as diffractive elements, any such polarizing materials are advantageously removed to increase transmitted light and reduce noise or other optical degradations. This permits the use of the LCD as a phase transmission hologram rather than as an absorption transmission hologram and will increase the light at the final plate 80.

Liquid crystal display 68 presents or displays data in a two dimensional picture or image element or picture element (pixel) array. The displayed information creates a diffraction array which causes various areas in the incident laser beam 57 (emerging from lens 56) to diffract into one or more diffracted beams 59, the number and character of which depending on the characteristics of the displayed data. In general, the diffracted beams 59 include an undiffracted or zeroth order (0th) beam 70, a first order diffracted pair (±1st) of beams 72a and 72b, a pair of second order (±2nd) diffracted beams 74a and 74b, and typically higher order diffracted beams (not shown), generally having lower amplitude and intensity than the lower order beams. The higher order beams may be, but are typically not, used in the preferred embodiments of the inventive apparatus and method. Those workers having ordinary skill in the art will appreciate that the existence and characteristics of the zeroth, first, second and higher order beams will be determined by the spatial information presented on LCD display 68. Where constant data (e.g. a clear aperture or fixed grey-level aperture) having only a so called d.c. component is presented by LCD 68, there will only be a single (undiffracted) beam referred to as the zeroth ($0^{th}$) order beam. For example, data simulating a sine function diffractive structure will diffract into several orders in each direction, and a kineform will diffract principally into the orders which it was designed to generate. Data forming or simulating blazed gratings, square wave gratings, and other grating structures may also be provided.

In the embodiment shown in FIG. 1, a mask in the form of an annular aperture 76 having clear (transparent) and opaque regions is provided which masks or blocks the zeroth (0th) order beam 70, the pair of second order (±2nd) beams 74a and 74b, and although not shown, also blocks the ±3rd, ±4th, and higher order beams. In this particular embodiment, only the first order (±1st) diffracted beams 72a and 72b are allowed to pass through the mask 76 to subsequently impinge at focal plane 80. The radial distance of the ±1st diffracted beams from the central optical axis are determined by the spatial frequency of the displayed LCD data, and the distance to and focal length of lens 56. As an example, for a lens 56 having a focal length of 35 millimeters, a 20 mm×15 mm LCD display having 640×480 pixels in each direction respectively, the inner radius (r1) and the outer radius (r2) of the aperture in mask 76 are about 3 mm and 15 mm respectively when the distance to the lens is adjusted to provide an exposure footprint (utilizing a 480×480 pixel area of the LCD) of about 0.127 mm (1/200 inch on each side). Embodiments wherein different beams are blocked or passed are described hereinafter, have different characteristics, and it will be understood that means for altering the optical system to selectively block or pass one or more beams may be provided.

These diffracted first order beams 72a, 72b are intercepted by a second lens, or LCD reimaging lens, 78 which redirects the diffracted first order beams back toward the optical axis and reimages the LCD display onto a predefined image focal plane 80, the focal plane at which a photo receptive material such as photographic film or etch resistant photo sensitive resist material 81 would be installed or applied in order to create the desired final hologram or diffraction grating. LCD reimaging lens 78 can be either a conventional high quality photographic or micro-photographic lens, a holographic optical element, or any lens system capable of imaging the LCD with good fidelity. Focusing the lens onto the film plane causes the overlap of the +1 and −1 diffracted beams incident on lens 78 thereby creating interference fringes at the focal plane 80 which becomes the grating structure in the photosensitive material 81.

The photo receptor 81 may be photographic film, photo resist material as used in the semiconductor production industry, or the like materials, and is mounted at image output focal plane 80 on a X-Y transport assembly 24 which is operative to transport the two dimensional photo receptor 81 in substantially orthogonal X- and Y-coordinate directions, in response to stepper motor transport control signals 84, 85, received from stepper motor control unit 22, so that where desired, a composite image may be constructed from a mosaic of separate exposures. Any conventional means for moving the photoreceptor 81 may be used such as motors, piezoelectric transducer, lead screw, or ultrasonic motors, for example so long as the photoreceptor 81 is maintained at the focal plane during movement. Means for sensing the actual focus at focal plane 80 may also be optionally provided, such as contrast or alternatively parallel detection means commonly employed in automatic focus detection and adjustment systems such as cameras. In such case, a z-axis movement means may also be provided for photo receptor 81 position adjustment.

Various linear movement means are known in the art and may be used for the X-Y position adjustment desired. Rotational movement capability may also be provided in a conventional manner. In the preferred embodiment, stepper motors 82 and 83 receive control signals in the form of pulses on control lines 84 and 85 respectively, from stepper motor control 22. Stepper motor control unit 22 receives inputs 86 from computer 20 in a conventional manner. It will be appreciated that the operation of shutter 52, LCD display 68, and stepper motor control unit 22, are coordinated via signals 21, 23 and 86 in an operative manner to provide the desired operation of the apparatus. It will also be appreciated that these functions may be performed by one computer 20, by separate computers, or by a controller integrated with the computer such as with a microprocessor, to perform the required device interface and control.

Numerous optical, electrical, and scientific products including lenses, shutters, diffraction gratings, spatial filters, multi-dimensional translation stages and other transport assemblies, rotation stages, and lasers are available from Newport Corporation, 1791 Deere Avenue, Irvine, Calif., 92714, USA, and may be employed in conjunction with making and using the inventive apparatus.

The entire optical subsystem of the inventive structure 15 illustrated in FIG. 1 may be enclosed in a housing (not shown) to preserve the cleanliness of the optical and mechanical components and to prevent stray ambient light from exposing the photo sensitive materials. Light baffles may also be included to further suppress any external light or reflected/scattered light within the housing.

Figure 2:
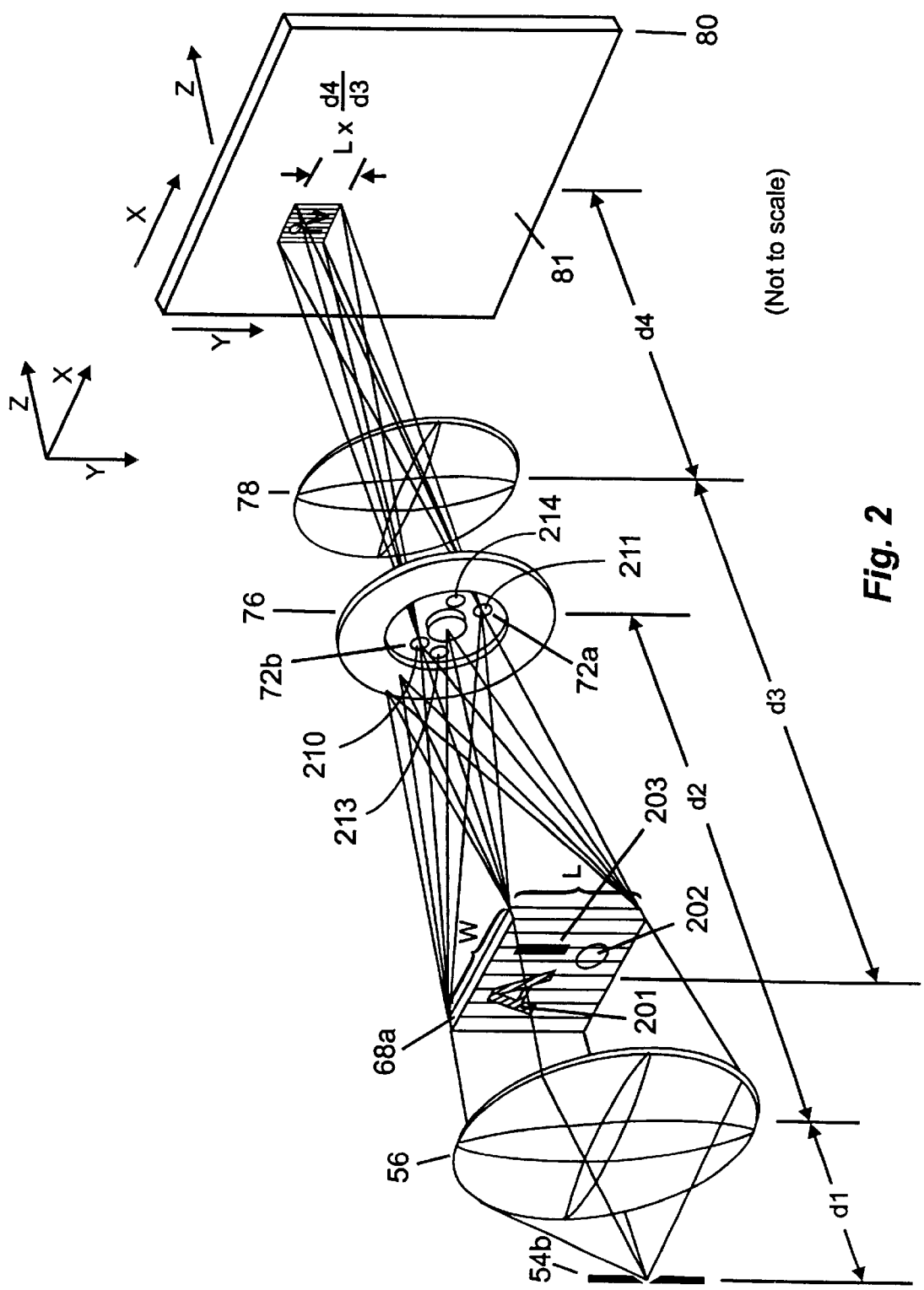
FIG. 2 is a diagrammatic illustration, somewhat schematic, showing some of the components of the embodiment in FIG. 1, but at a larger scale so that details of the diffracted waves and the relationship between the image displayed by the LCD and the output are more readily apparent.

The structure of an embodiment of the inventive apparatus having now been described, attention is now directed to a partial diagrammatic perspective drawing in FIG. 2 which shows some of the components in FIG. 1, but at a larger scale so that details of the diffracted waves and the relationship between the image displayed at LCD 68a and the output image at focal plane 80 are more readily apparent.

Figure 3:
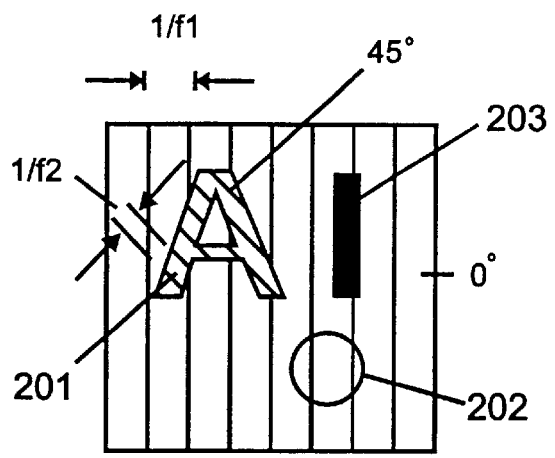
FIG. 3 is a diagrammatic illustration, somewhat schematic, showing a planar representation of the LCD and exemplary data displayed thereon.

LCD 68a is shown presenting or displaying the composite image of the outline of a letter A (as an exemplary graphic) in which diagonal fringes 201 within the A (at about 45-degree inclination counter-clockwise from vertical) are displayed on a background of vertical fringes 202. (The LCD drivers, associated electronics, and signal lines are not shown). The spacing of the fringes in the drawing is illustrative only. In a typical implementation of the inventive structure and method, for a 20 mm×15 mm display of 640×480 pixels, fringes would have center-to-center spacings of about 220 microns, the resulting ±1st order beams being diffracted to diverge after passing the LCD at an angle of about ±0.1 degrees. A planar representation of the LCD 68a and the data displayed thereon is shown separately in FIG. 3.

The exemplary LCD 68 has 640 addressable samples in one dimension (e.g the x- or horizontal direction) and 480 addressable lines in the orthogonal direction (e.g. the y- or vertical) direction, and measures about 20 mm by about 15 mm. The pixel dimensions are about 30 microns on a side. The thickness of the LCD module in the z-dimension ($Z_{LCD}$) is about 1.1 mm. The LCD is preferably active matrix and has a small pixel spacing, good contrast, and a relatively large active area per pixel. For, example the Hitachi Model MTM25V01 LCD made by Hitachi may be used. It is also anticipated that LCD displays having smaller addressable pixels (e.g. 15 micron or smaller) and larger arrays of pixels (e.g. 3000×3000 or larger pixel arrays) are or will become available, and that such larger and/or higher resolution LCD displays may also be advantageously employed in the invention.

The LCD 68a is reimaged onto the image focal plane 80 at greatly reduced scale by lens 78 positioned such that in the exemplary embodiment illustrated, the ratio of third to fourth lens conjugate distances $d_3/d_4$ is about 200:1. In this configuration, the LCD is reimaged at a magnification ratio of 200:1, such that a one-inch LCD section is reimaged as a 1/200 inch optical image of the LCD at the image plane 80.

Different parts of the LCD image, that is, the vertical background fringes 202, and the "A" diagonal fringes 201, cause diffraction of the incident light at different angular orientations and/or at different radial distances from the optical axis. Even the physical structure of the LCD (e.g. the array of equally spaced pixels) itself diffracts light. Undiffracted light remains along the central optical axis, and higher spatial frequencies including light diffracted by the LCD pixel array itself result in greater angular deviation.

The physical separation of the diffracted beams is a function of the exposure wavelength, the spatial frequency of the displayed data, and the distance from the LCD to lens 78, according to the relationship defined in Bragg's Law, i.e. Lambda=2D×Sin(Theta) where λ is wavelength of the light, D is distance, and Theta is the diffracted angle. A separation is chosen which will produce the desired spatial frequency at the final image plane and this will depend on the focal length of lens 78, again applying Bragg's Law. Note that in this disclosure the terms diffraction, grating, hologram, and the like are used synonymously.

Although data to generate a fringe structure (e.g. 201, 202) is generated by, or stored on, computer 20 and displayed on LCD 68, the fringe structure at the LCD generated by individual resolvable pixels or groups of pixels on the LCD is not typically reimaged into focal plane 80. In fact, the fringe structure required at focal plane 80 to produce the hologram will generally be beyond the resolution and/or contrast performance of the preceding optical system components. The fringe structure present at LCD 68 is not actually imaged by the lenses in that it is not optically transferred from the LCD plane to the focal plane 80. Instead the fringe structure displayed on the LCD diffracts the incident laser beam 57 generating the diffracted orders so that they separate from the optical axis as illustrated at the plane of mask 76 in FIG. 2. Lens 56 causes the diverging beams (0th, ±1, ±2, ±3, etc) to come to separate foci in the plane of lens 78. Energy diffracted from the background fringes at constant frequency $f_1$ is concentrated in regions 210 and 211 at lens 78, and the energy from the A fringes at constant frequency $f_2$ is concentrated in regions 212 and 213 at lens 78.

Figure 4:
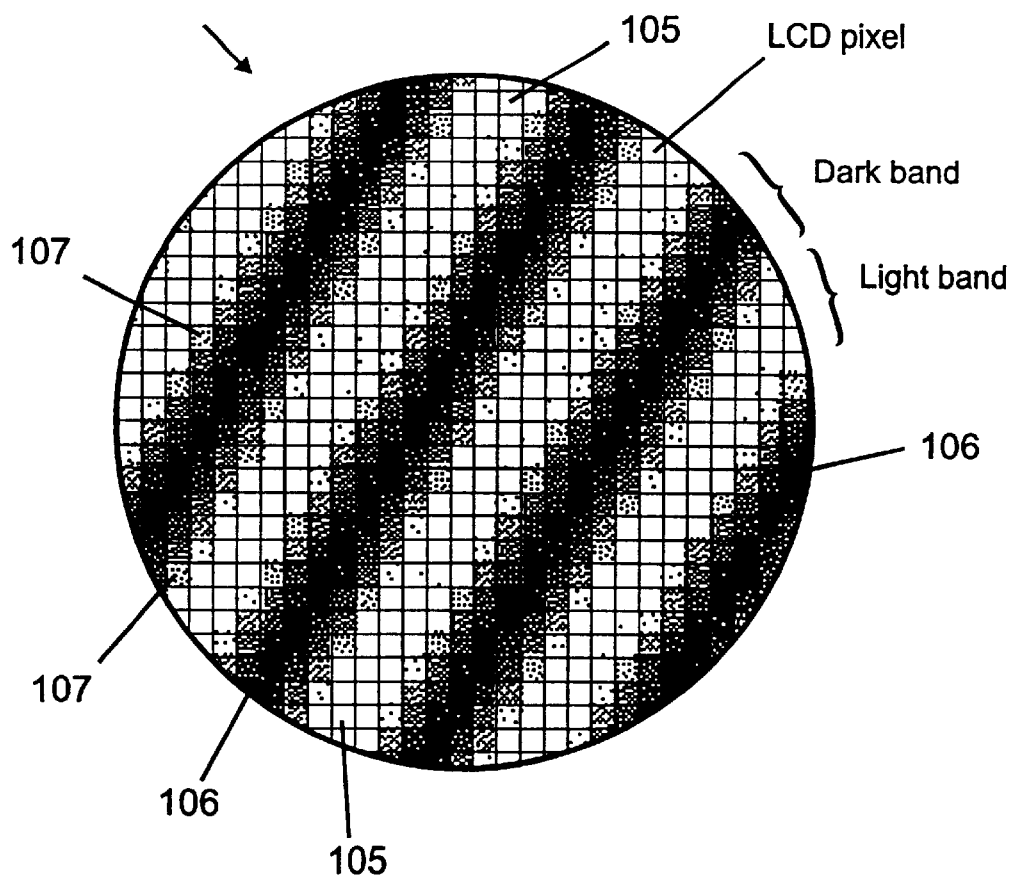
FIG. 4 is a diagrammatic illustration, somewhat schematic, showing an exemplary grey-level fringe pattern (alternating bands of light and dark) on LCD display.

FIG. 4 shows a diagrammatic illustration of exemplary fringes (alternating bands of light and dark) on the multi-grey level LCD display. Fringes can be generated having sinusoidal, square-wave, sawtooth, binary, or other mathematical characteristics. Generating the diffracting pattern on the LCD in this manner using a multi-level (e.g. 256 grey level) display provides advantages over a binary display having only two levels because of this flexibility. The white area 105 in FIG. 4 represents low density transparent regions of the LCD, and the black areas represent high density regions. The "speckled" regions 107 represent intermediate grey scale areas of the LCD having intermediate density, and the density is constant within any one addressable LCD pixel. The speckling is merely used in the drawings to provide the appearance of a multiplicity of grey levels.)

In the embodiment illustrated in FIGS. 1 and 2, only the ±1st order beams 72a, 72b from each of the background LCD fringe pattern 202 (shown in the plane of mask 76 as regions 210, 211) and the beam diffracted from A region 201 (shown in the plane of mask 76 as regions 213, 214) are allowed to pass mask 76. (For purposed of clarity, approximate ray traces for the incident and diffracted orders are only shown for the background LCD fringes.) Upon existing mask 76 second lens 78 located at the focus of first lens 56 redirects the ±1 background and A diffracted beams (and in other embodiments, other diffracted orders) from each region of the mask 210, 211, 212, 213 so as to reunite or overlap all of the beams diffracted from the LCD image at their respective positions in focal plane 80. (Region 203 has a constant grey level without fringes and does not diffract any significant energy outside of the d.c. or 0th frequency order component.) These intersecting beams cause interference and because the ±1st order beams are used, the number of interference fringes are effectively doubled over those that would result from interference between the 0th order and either of the +1 or −1 order beams. In general, the LCD may display a virtually unlimited graphical content and such content is not limited to the examples specifically described in this description. Those workers having ordinary skill in the art, in light of this description will appreciate the manner in which content dependent diffraction occurs as a result of diffraction by data displayed on LCD 68, and the manner in which the frequency components of that diffraction are separated in the Fourier transform plane of mask 76.

The relationship between the image data fringe spacing on the LCD and the interference fringes produced on the output focal plane 80 is linear and is determined by the distances between the optical components and the focal length of lens 78. For example, if the LCD region representing the letter A had 15 fringes across the length of the "A", then the final hologram would contain 30 fringes across the area containing the focused "A", and these fringes would have a spatial frequency 400 times that of the original, though the image of the "A" would have been reduced only 200 times.

Therefore, the inventive structure and method provide for extremely high spatial frequency grating structures and holograms at the focal plane 80, in spite of the relatively modest resolution at the LCD itself. Of course the image will be transposed, that is flipped or mirrored about the vertical and/or horizontal axis, but these effects are conventional and easily accounted for either by reorienting the photosensitive material 81, or by geometrically manipulating the data sent to LCD 68 so that the final output has appropriate geometrical orientation on the photo sensor. The distribution of light in the lens plane 78 is a frequency domain representation (e.g. Fourier transform representation) of the information in the LCD plane.

Figure 5:
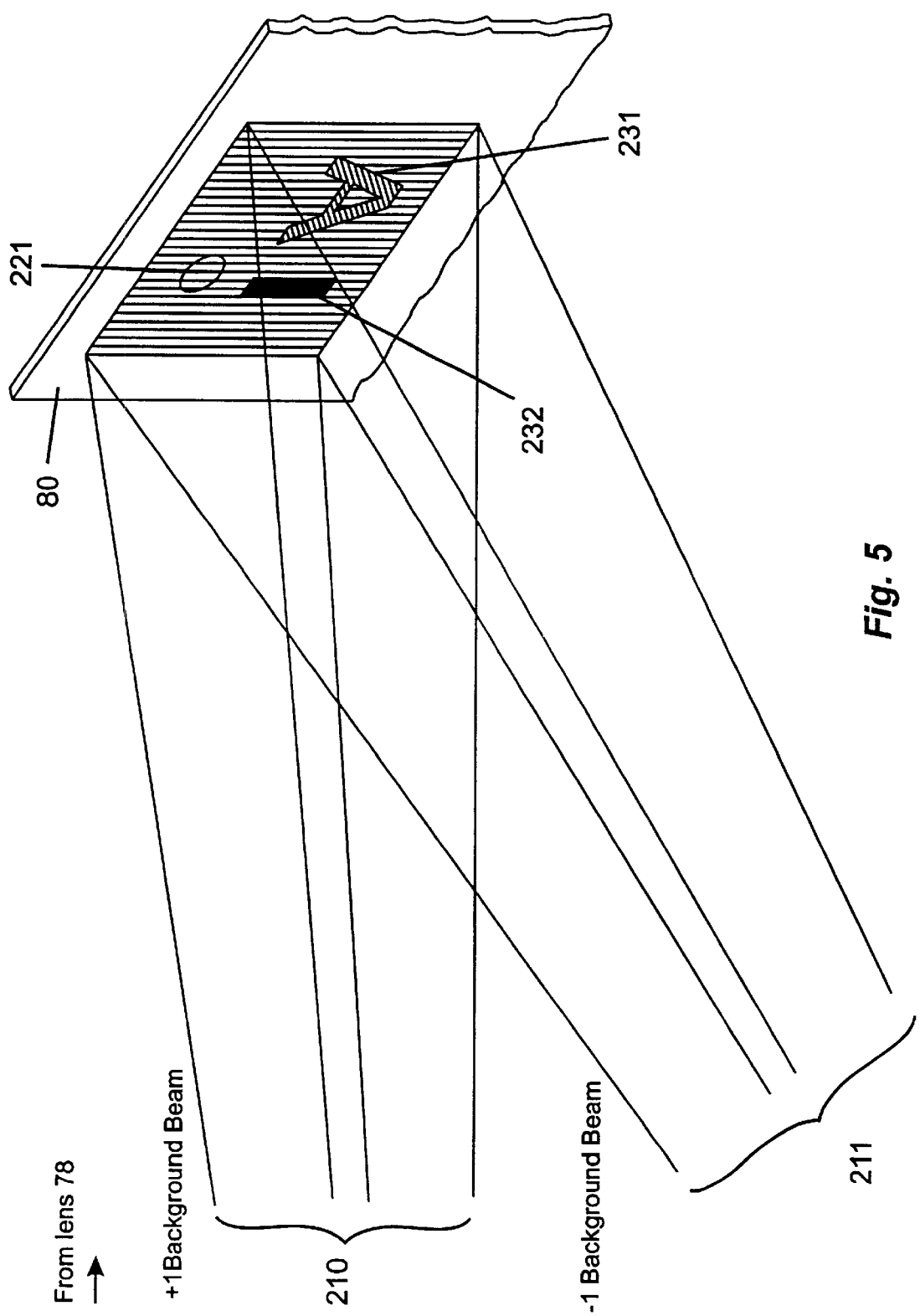
FIG. 5 is a diagrammatic illustration, somewhat schematic, showing the mechanism by which the ±1st order diffracted beams from certain regions displayed on the LCD are recombined to generate new interference fringes in focal plane.

The mechanism by which the 1st order diffracted beams from the background regions 210, 211 are recombined to generate new interference fringes 221 in focal plane 80 are illustrated further in FIG. 5. The ray trace lines generally indicate how the light from regions 210, 211, 212, 213 at the plane of mask 76 diverge from points in the plane of lens 78 to overlap at the output focal plane 80. Although ray-trace lines are not illustrated in FIG. 5 for the A region 231 or the black region 232, new fringes are also produced in similar manner from the A region. Region 232 remains unexposed in the output plane 80 since no light was diffracted from the LCD data in region 203, and since undiffracted components are blocked by the central stop of mask 76.

In general, the LCD 68 will display an image having one or a plurality of frequency components defining an image or a portion of an image. These components diffract the laser light A causing separation of the spatial frequency components in the Fourier transform plane of the lens 78, and subsequent recombination by lens 78 at the focal plane.

Figure 6:
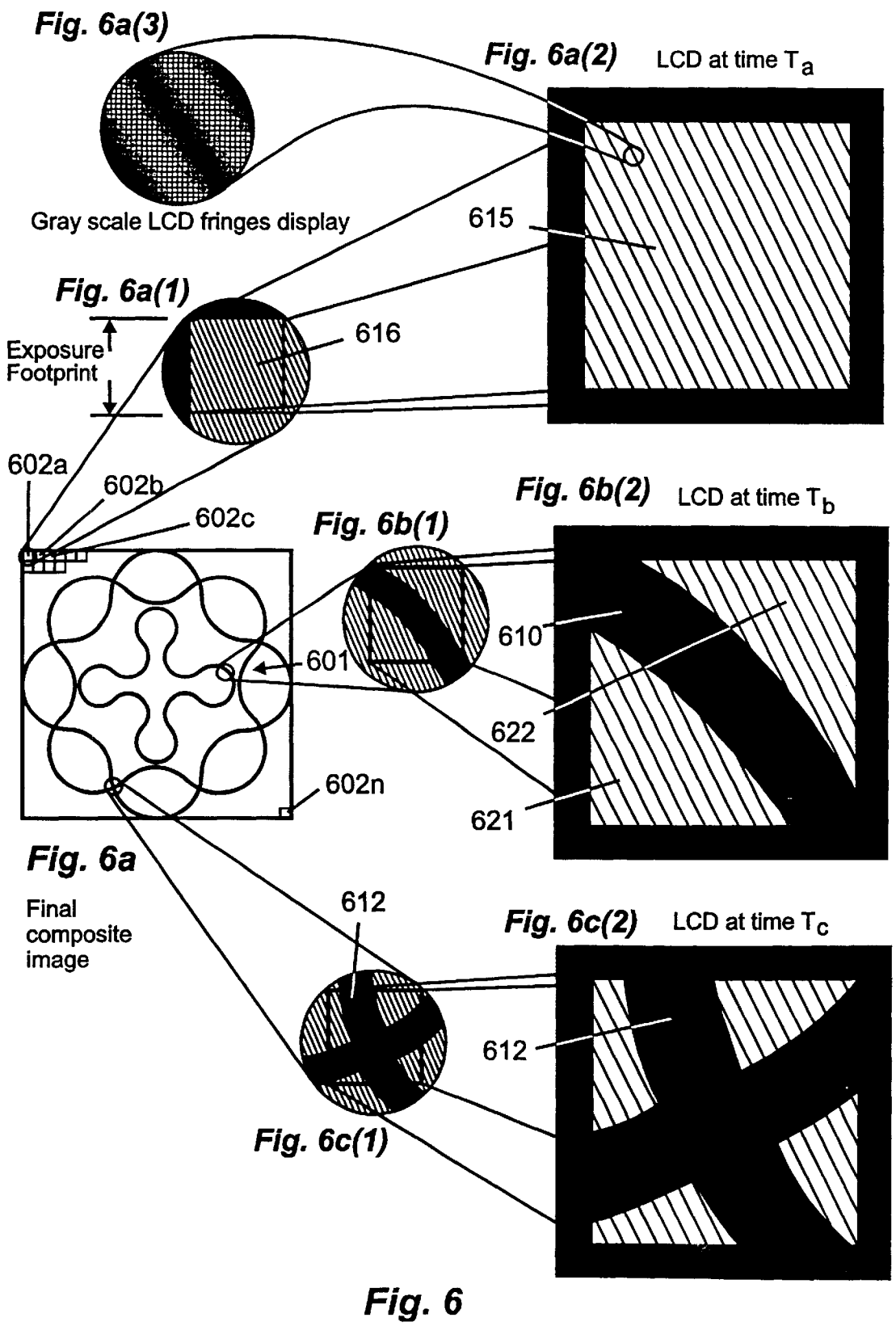
FIG. 6 is a diagrammatic illustration, somewhat schematic, showing the manner in which a more general composite output graphic design is built up from component parts.

The manner in which a composite output graphic design 601 is built up is now described with respect to FIG. 6. Magnified portions of several exemplary portions of each exposure area 602a, 602b, and 602c of the composite focal plane graphic and corresponding LCD inputs are illustrated in FIG. 6, that is in FIGS. 6a(1), 6a(2), 6b(1), 6b(2), and 6c(1), 6c(2), respectively. In this example, the LCD has 480×640 addressable elements but only a square 480×480 is used to display data that appears in the demagnified footprint. Each of the smallest rectangles 601 represents an LCD footprint. The composite output image can be any size, for example it can vary from the size of a single LCD footprint (1/200 inch×1/200 inch in this case), to the several hundred or more footprints on each side of the composite image. A composite image built up from a 400 by 400 array of LCD footprints (160,000 exposures) at a 1:200 LCD demagnification would be about 2 inches square.

With respect to FIG. 6a, each region 602a, 602b, and 602c represents an exposure "footprint" of the full LCD display 68 as reimaged onto the final photosensitive plate material 81 in focal plane 80. In this embodiment, the composite image is built up a "footprint" at a time. In general, the exposed region at plate 81 could correspond to the entire LCD screen (e.g. 640×480 pixels) or it could correspond to a subportion of the LCD screen area, for example, it could correspond to a square 480×480 pixel region, or to 1/16 of the LCD area (e.g. 160×120 pixels), or any other portion.

The rectangular area within the circular region identifies the pixels in the LCD only, as the dark border does not actually exist in the output data. The individual LCD footprints are precisely aligned so that each footprint abuts without overlap or gap. Also, it will be understood that the region within the magnified circle and the darker rectangular border represents LCD data that appears in the composite and is not a component of the LCD itself during that particular exposure.

It is convenient, from an imaging and software standpoint, to utilize a square region of the LCD to correspond to the exposure footprint. Here an exposure footprint corresponds to a 480×480 pixel section of the display which is reimaged at 1/200 scale. The composite image is built up from a series of exposures, such as for example: (i) the exposure footprint illustrated in FIG. 6a(1) at time to $T_a$ from the LCD data in FIG. 6a(2); (ii) the exposure in FIG. 6b(1) at time $T_b$ from the LCD data in FIG. 6b(2); (iii) the exposure in FIG. 6c(1) at time $T_c$ from the LCD data in FIG. 6c(2); and (iv) other exposures (not shown); to build up the entire image comprising regions 602a, . . . , 602b, . . . 602c, . . . etc. as shown in FIG. 6a. It is generally convenient to control the x- and y-motion of stepper motors 82 and 83 to sequentially step the photosensitive material in x- and then y-dimensions until the entire image is formed as a latent exposure.

In other embodiments, different wavelength lasers may also desirably be employed to expose different or overlapping regions so that each exposure is made at both a different location and with a different wavelength. Other embodiments may also incorporate scales other than 1/200. Further embodiments may physically or optically abut multiple LCD arrays so that exposure is performed in parallel.

The large thick dark (black) region 610 in the LCD data shown in FIG. 6b(2) and region 612 in FIG. 6c(2), are data regions that will form black line regions in the final image. The dark black regions 610, 612 in the LCD do not diffract the incident laser radiation, so that no light is reimaged back to the corresponding regions in the final output focal plane 80. LCD regions displaying fringes, such as region 615 in FIG. 6a(2) (here the entire 480×480 region of the LCD display) diffract light into ±1st order beams which become imaged to form new interference fringes over the footprint 616 in FIG. 6a(1). As each of the footprints 602a, . . . , 602n is a representation of the LCD display, the image created by diffraction at the focal plane 80 will look substantially like the image being displayed at the LCD except for the optical mirroring, flipping, or other inversions that necessarily occur after passing through center optical components. In other words, some of the footprints will be entirely filled with fringes oriented in the same direction, some of the footprints will also have black or unexposed regions, and some footprints will have a multitude of diffractive patterns at different spatial frequencies or angles.

In the simplest case, each region 602a, . . . 602b, . . . , 602c, . . . 602n in the image plane 80 of FIG. 6a is created by a data display on the LCD, that is, it is formed from the entire image displayed on the LCD 68. A step and repeat procedure, described hereinafter, steps each exposure in both x- and y-coordinates. For each step, the data (image) displayed on the LCD is or may be changed.

With further reference to FIG. 6, FIG. 6A is a diagrammatic illustration of the manner in which the image at the plate 80 is built up or integrated from a sequence of separate exposures. Exposure 1 (region 602*a*) is formed at time $t_1$ by sending data to LCD 68 having a fringe pattern only at a frequency of about 7 pixels and at an angle of about 135 degrees clockwise from vertical. Exposure 2 (region 602*b*) is formed at time $t_2$ by stepping the plate 80 along the x- or horizontal axis by distance of about 0.005 inches corresponding to the size of the LCD display area times the magnification factor (actually a reduction factor of 1/200 in this example). For example, if the LCD has a 1-inch display area, and the magnification is 1/200, then the step increment in x- and y-directions will be 1/200 inches so that the successive exposures will abut without overlap. Exposure 5 (region 602*c*) is formed at time $t_5$ by displaying an LCD display as shown in FIG. 6*b*(2) wherein pixels on the lower left and upper right hand side regions 621, 622 contain only fringes, and pixels in region 610 form an arcuate path from upper left to lower right that are either black or clear (here shown as black) so as to avoid diffraction from this area.

Note that the fringes in the LCD 68 created by digital data are generated from computer 20, while the fringes at the output plate 80 are produced by physical wave interference of the recombined diffracted orders, here the +1 and −1 diffracted orders. The LCD display fringes and interference fringes formed at the output plane also have a different physical separation and corresponding spatial frequency but have the same relative orientation (except for optical reversal) as the LCD displayed fringes.

Beams incident onto the black areas 610, 612 of the LCD are not diffracted since these regions do not display fringes. Whether these regions are represented as black or clear in the data sent to the LCD, and whether or not the polarizing filters are left on the LCD, the light incident on these regions passes through as undiffracted energy in the zeroth order beam, and in this particular embodiment are blocked by mask 76 so that no light from this area reaches plate 80 from areas 610 and 612.

Figure 7:
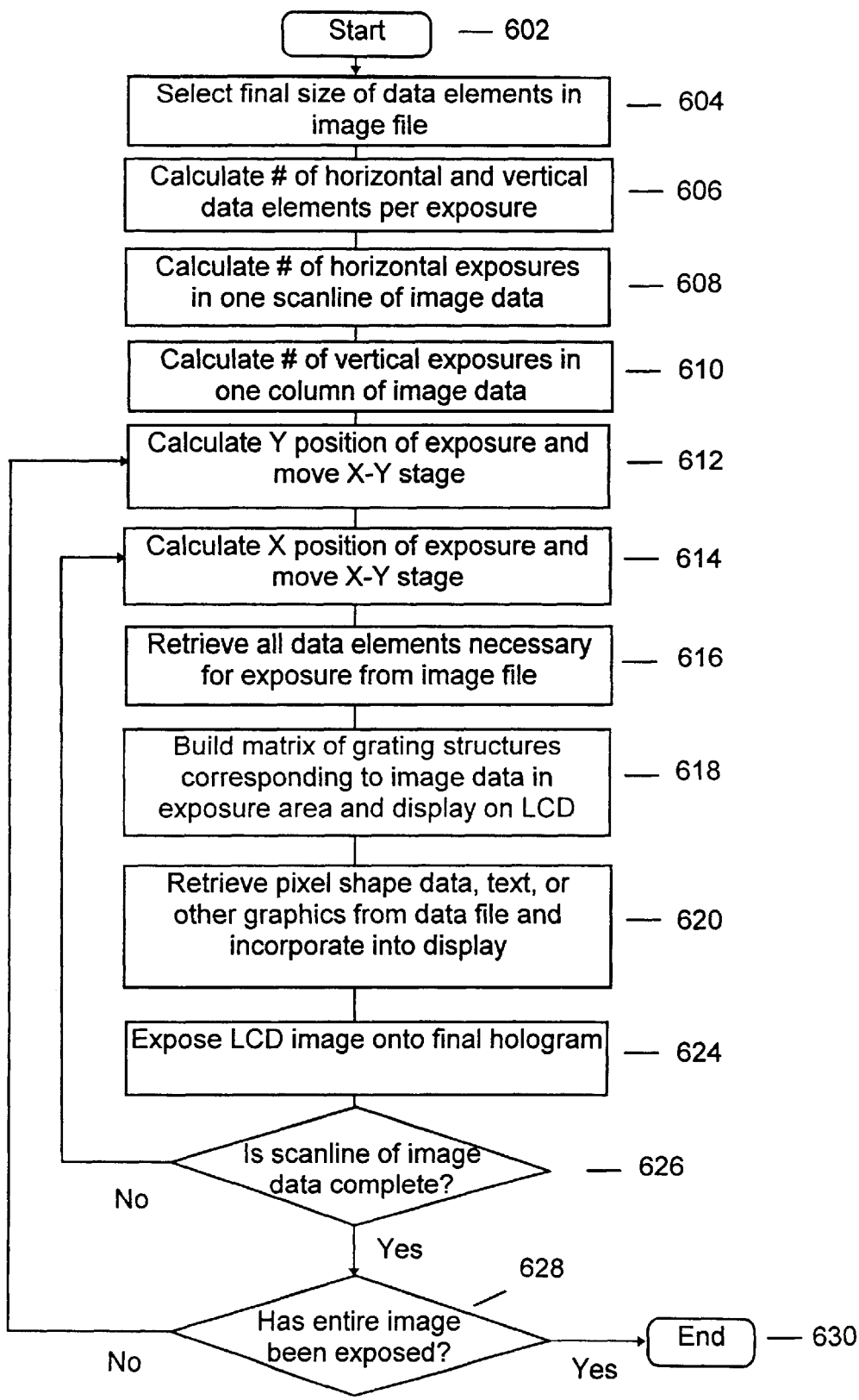
FIG. 7 is a diagrammatic illustration, somewhat schematic, showing an embodiment of the inventive method for generating a hologram.

An embodiment of the inventive method 600 is now described with reference to FIG. 7. The method begins (step 602) with the choice of the final size in the hologram of the data elements from a digital image file (Step 604), i.e., the choice of how many data elements will be displayed on the LCD per exposure. This digital image file defines the data to be displayed in each sub-region or super-region (if the elements define areas larger than the footprint of the system) of the LCD 68. Next, the number of horizontal data elements (image samples) and the number of vertical data elements (image lines) per exposure are calculated (Step 606). Once the size of the horizontal and vertical data elements are known, the total number of horizontal exposures or footprints in the x-direction are computed (Step 608), as well as the total number of vertical exposures in the y-direction (Step 610). These computations define, in conjunction with the size of the data display (e.g. the LCD 68) and the optical magnification (reduction), the final size of the composite output image. Note that characterization as horizontal or vertical, or as X-, Y-, or Z-coordinate are merely for descriptive convenience, and that those workers having ordinary skill in the art in light of the description provided herein will appreciate that the inventive apparatus and method may be oriented or implemented in any orientation and are not constrained to horizontal or vertical orientation, and that motion of the photo sensitive materials relative to the optical system output beam(s) may be performed using non-orthogonal movements.

Prior to exposing the first footprint, the X- and Y-positions of the stage 24 are adjusted for the location of the first exposure (Steps 612, 614). Normally exposure will begin at one corner and proceed in a back and forth raster pattern, however, any other exposure location addressing scheme may be used so long as accurate positioning is maintained.

Data is created or preferably retrieved from memory storage 18 (Steps 616, 618) coupled to computer 20, and sent via display controller 68*b* to LCD display 68 (Step 620). The data may include periodic or non periodic grid lines (fringes), as well as text and graphics data, and the like. The grid data may include linear diffraction fringe data, but is not limited to linear forms, and it is contemplated that any form, including circles, ellipses, polygons, and any other shape may be displayed including representations of more complex diffractive data such as holographic fringe patterns. The data may be created and/or stored in raster, vector, or any other conventional form, and may be compressed or uncompressed, but ultimately it is displayed as a two-dimensional matrix of pixels that define diffractive structures or constant areas as already described. The display preferably displays data in a multiple grey level monochomatic format preferably having at least 256 grey levels. Displays having more than 256 grey levels may be used with some increase in quality and cost, and displays of fewer grey levels may be used with some possible degradation. Binary displays (e.g. pixel is either ON or OFF) may be used for certain limited applications.

Once the data is displayed, the computer commands shutter 52 to open for an appropriate exposure time that will depend on the transmissivity (density) of the LCD, optical throughput of the system, and the sensitivity of the photosensitive material 81 in conventional manner, thereby exposing the LCD display onto the photo resist material to create the hologram (Step 624). After all regions are exposed, the latent image is developed or otherwise processed in conventional manner to form the diffraction grating or holographic structure(s).

The computer 20 computes the new position for the second exposure by stepping in the scan line (horizontal) direction (Step 626), retrieving or generating appropriate data for the second exposure, displaying the data, and exposing the new data as before. This process is continued until the complete scan line is exposed. The entire process is repeated for the next y-coordinate position until the entire image has been exposed (Step 628, 630). It should be noted that while a rectangular array of footprints is illustrated, the exposure pattern need not be rectangular, and that the footprints may be non-rectangular and/or disjoint from each other if the application requires these characteristics. The invention structure and method are very flexible in this regard.

The data generated for the LCD 68 will typically be a raster type image file. For example, one example of data that would generate a diffraction grating at the surface of the final hologram would be a graphical representation of the fringe structure of a diffraction grating saved as a Windows BMP (bit mapped) file or as any other file format, whether standardized or not, so long as it can be displayed on the LCD.

Figure 8:
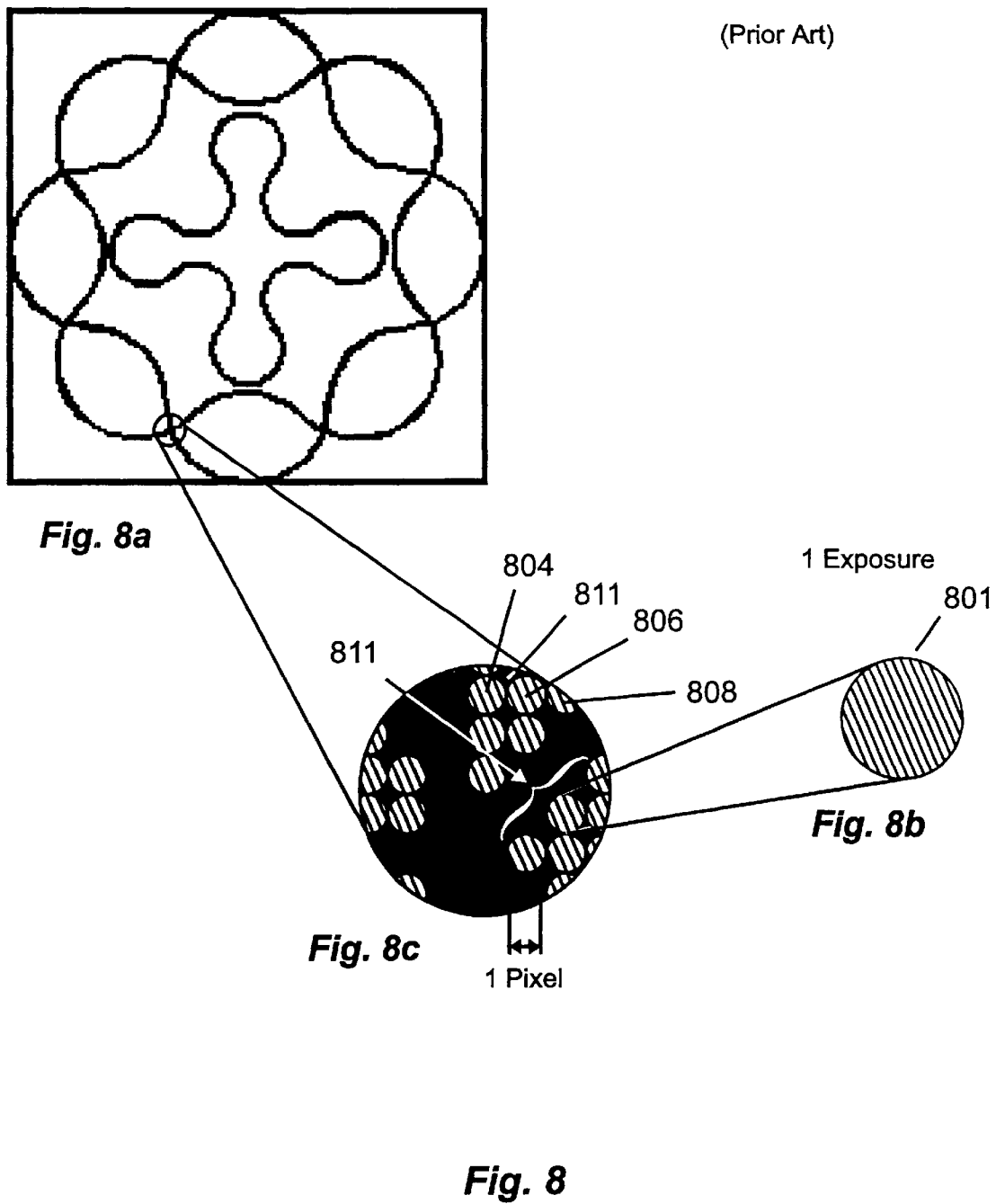
FIG. 8 is a diagrammatic illustration, somewhat schematic, showing an image section related to a prior-art procedure for generating a hologram.

FIG. 8 illustrates image section for a prior-art procedure for generating a hologram. From this diagram it is clear that the inventive structure and method provide a fundamentally different approach as compared to other possible structures and methods. FIG. 8, shows an output having an overall macroscopic appearance similar to the output generated by the inventive apparatus in FIG. 6*a*, but which actually differs in significant ways, both at microscopic and macroscopic levels.

In conventional methods and apparatus, each region of the holographic output is formed by the exposure of a region 801 on the photoreceptor, such as a photo resist material as illustrated in FIGS. 8*a* and 8*b*. The laser light and data pattern for the exposure is formed at the photoreceptor by focussing two narrow gaussian intensity profile laser beams onto the surface. The interference fringe pattern is formed by interference of the two overlapping beams. No microscopic data other than the fringe pattern itself can be recorded as there is no mechanism for imaging anything more complex than the point which is exposed as a gaussian beam. By comparison, the inventive apparatus and method provides a means to add microscopic type or other graphics to each exposure region and to expose any number of gratings at arbitrary angles and spatial frequencies in the same or different areas of the exposure footprint simultaneously, and to control the content of each exposed region in a very controlled and flexible manner.

In the existing conventional device and methods, the practitioner is limited to a single or fixed number of grating spacings. Among its numerous advantages, the inventive apparatus and method provides for a continuously variable grating spacing.

While some prior art methods provide for using a rotary turret holding a plurality of different diffraction gratings, the number of gratings is limited by physical space, and the ability to maintain optical alignment is compromised as the physical size of the turret is increased to accommodate a greater number of gratings. Therefore, as a practiced matter, the number of gratings that could be implemented using conventional techniques is severely limited. The present invention allows an almost infinite number of LCD images for use as gratings (limited only by the LCD quantization and the overall LCD and lens sizes) so that it is not necessary to stop to rotate the turret to obtain different gratings as in conventional systems.

In these conventional systems, the orientation and frequency of the interference fringes present in each exposure region 801 (see FIG. 8), are determined by the phase difference of the interfering beams, and are not easily controlled. These prior art devices rely either on a fixed fringe pattern, or rely on physical changes (e.g. mechanical modifications) to the optical system in order to change the output interference pattern spacing or orientation. At best, these prior art device may provide means for rotating the beam splitter responsible for creating the reference and data beams, and/or for altering the path/phase difference between the beams to effect the fringe spacing and angular orientation. Conventional systems have not provided means to alter the spot size so that the footprint in the output focal plane could be changed. Finally, conventional devices are not known to provide any means for shaping the output spot at the output focal plane and the output footprint is limited to circular spots having diameters only as small as about 1/400 of an inch (about 0.0025 inches) as illustrated in FIG. 8*d*.

Therefore, even if conventional systems were modified to add capability to mechanically alter the optical system to change fringe orientation, fringe spacing, spot size, and spot shape (if possible with conventional gaussian beam shape) these additions would necessarily slow the exposure cycle during the mechanical change and decrease system stability since components cannot be fixedly mounted in a stable configuration. They would also be prone to mechanical vibration and/or to misalignment.

In addition, even if circular exposure regions (e.g. 804, 806, 808) were directed to abut at their tangent points, they would not completely fill the space but would leave regions such as regions 810, (see FIG. 8*d*) without exposure. Because individual exposure regions cannot have unique contours the final image will have jagged or pixellated edges 811. The black areas in FIG. 8 including the large exposures of black surrounding the generally circular area and the black star shaped areas between the exposure circles need not be exposed.

In such conventional systems, the exposure process must be stopped when a change in optical characteristics is required (e.g change in fringe frequency) which thereby slows the exposure process, or all regions having the same fringe characteristics must be exposed (skipping different regions) and then the process is repeated for regions requiring different characteristics. The present invention clearly solves the problem in these conventional systems.

While several embodiments have been described that use a Liquid Crystal Display (LCD) to display data that diffracts light as described, those workers having ordinary skill in the art in light of this description will appreciate that the LCD is one device of several devices that provide means for presenting or displaying information at a high resolution and in a small format, and that further provide means for rapidly changing the information content of that display without physical movement of the device, other optical system components to achieve movement, or the information containing media itself. Other types of data displays such as micro-mirror devices that operate in a reflection mode with suitable folding of the optical system, and other spatial light modulators such as the Light-Valve spatial light modulator made by the General Electric Corporation may be used.

Multiple LCD displays might also be used and optically combined at the focal plane 80 to build up the entire image at the same time rather than sequentially or in sections. For example, four LCDs could be set up and used simultaneously. They could be either be set to image adjacent regions or offset; the step and repeat would be adjusted accordingly.

Figure 9:
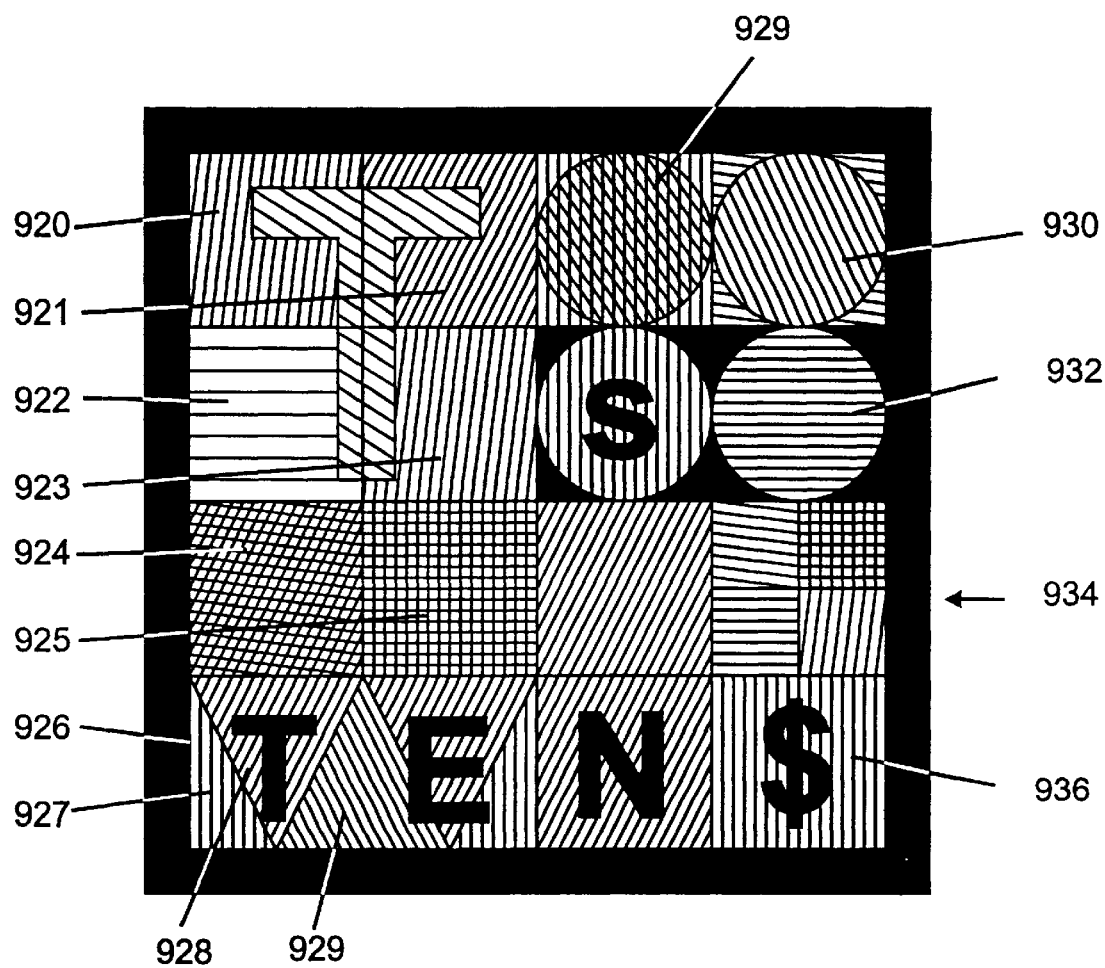
FIG. 9 is a diagrammatic illustration, somewhat schematic, showing additional features of the inventive structure and method including a super-region formed from a plurality of regions corresponding to addressable portions parts of a full LCD display.

Other features of the inventive structure and method are now described with respect to FIG. 9. Here super-region formed from a plurality of regions correspond to parts of a full LCD display, and each separate region (e.g. region 920) corresponds to ¼ the linear dimension or ¹⁄₁₆ of the area or total number of pixels of the entire LCD display. This demonstrates the great flexibility of the invention, where in a single exposure, regions of the final image can be created incorporating a multitude of spatial frequencies, overall shape, multidirectional fringes, and microscopic graphic or text structures. In similar manner, other arbitrary numbers of regions can be imaged together and exposed simultaneously.

For example, in FIG. 9, a large text letter T is illustrated in the upper left hand region of the LCD 68. The screen is divided into 16 regions each display different data, including different fringes. The T is superimposed on four regions 920, 921, 922, 923. The T is displayed at one spatial frequency, which is different from the spatial frequencies of the other regions 920, 921, 922, 923 which it overlies or is contained within. The T is formed at a different spatial frequency and at a different angular area from the surrounding regions, and will therefore diffract to a different angle and/or to a different radial off-axis distance from the other regions 920, 921, 922, 923.

In the exemplary system, the entire footprint for the exposure created from FIG. 9 would be 1/200 inch, yielding a plethora of image information at much finer effective resolution, clearly unachievable by conventional holographic systems where each exposure region is an undifferentiated dot of similar size. While similar images could conceivably be produced using E-Beam systems or by other systems if alignment could be kept accurate enough to allow much smaller foci, the former would be constrained to scan each fringe in the final image area individually, and the latter would have to expose hundreds of dots to compose an exposure similar to the one created in the exemplary system in a fraction of a second.

With respect to the triangular areas 927, 928, 929, image elements are not constrained to any particular geometrical form, for example, they are not limited to square or rectangular regions. Regions may be rectangular, hexagonal, triangular, circular, or have a completely arbitrary shape so long as the area can be defined by the distribution of pixel levels displayed on the LCD pixel array.

The LCD screen can either be subdivided or alternatively used as subdivision of a larger image area, that is larger than the footprint of the system. The term footprint refers to the entire exposure area on the photoreceptor plate 81 for each exposure, and is different from the term "pixel" which refers to an addressable element of the LCD. Footprint is the entire utilized LCD area as it has been reimaged and reduced onto the photo resist material 81.

While the embodiment of the invention illustrated in FIG. 1 has been described in detail, various alternative embodiments may also be implemented to practice the inventive structure and method.

Figure 10:
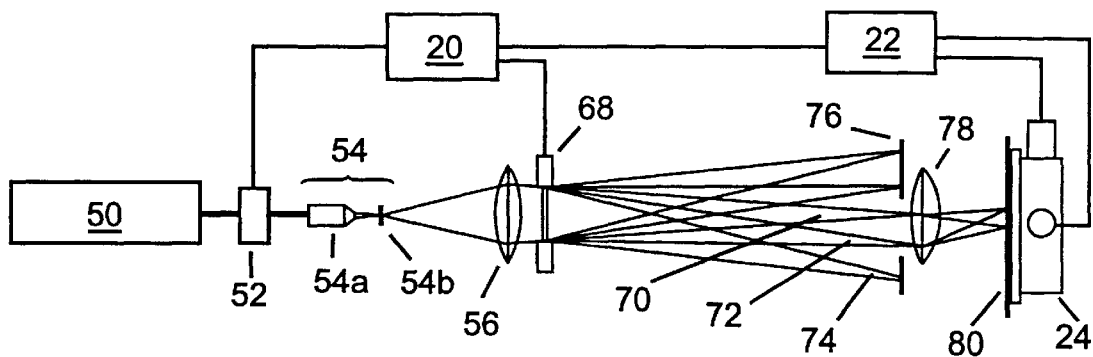
FIG. 10 is a diagrammatic illustration, somewhat schematic, showing an alternative second embodiment of the inventive apparatus already shown and described relative to FIGS. 1–4 wherein light reaching the photo receptive material are made by contributions from the undiffracted zeroth (0th) order beam and either one of the 1st order diffracted beams.

For example, with reference to FIG. 10, an alternative embodiment of the inventive apparatus similar to the embodiment already described is shown, except that exposures at the photo receptive material 81 are made by contributions from the undiffracted zeroth (0th) order beam 70, and either one of the diffracted beams 72a, 72b. The other diffracted beams are blocked by a somewhat different aperture or mask 76b which blocks all frequencies except 70 and 72a (or 72b).

This second alternative embodiment is different from that described relative to the embodiment in FIG. 1 because the interference fringes created at the photoreceptor plane 80 are generated by interference between the 0th (undiffracted) beam and one other diffracted beam 72a. The spectral frequency of the fingers are ½ that frequency which would be provided by the embodiment in FIG. 1, since the angular difference between the 0th and the +1 or −1 beams is ½ the angle between the +1 and −1 beams.

Figure 11:
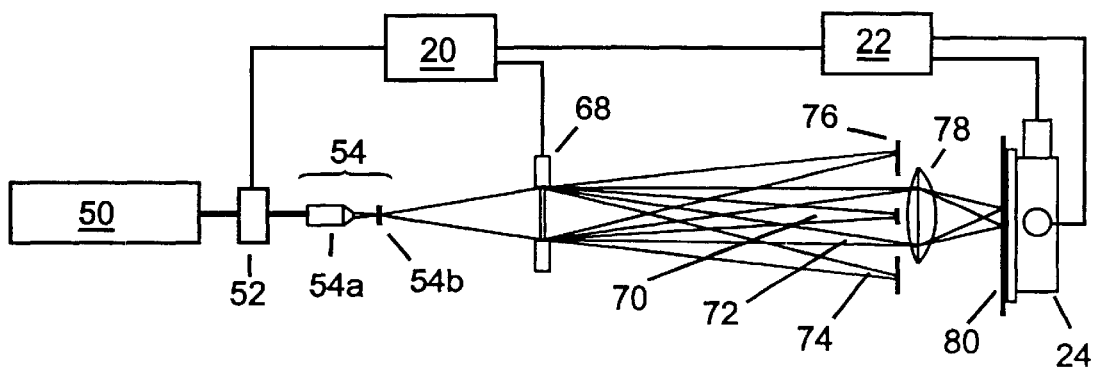
FIG. 11 is a diagrammatic illustration, somewhat schematic, showing an alternative third embodiment of the inventive apparatus having characteristics analogous to the embodiment shown in FIG. 1, but having a Kineform or a Gabor Zone Plate created within the LCD to effectively refocus the expanding beam emerging from the spatial filter assembly in the absence of a separate condenser lens.

With reference to FIG. 11, which shows a third embodiment of the inventive apparatus having characteristics similar to the embodiment shown in FIG. 1, but having no separate condenser lens 56 interposed between the spatial filter assembly 54 and the liquid crystal display 68. In this configuration, a structure analogous to a Kineform or a Gabor Zone Plate is created within LCD structure 68 which effectively forms a condenser lens that refocuses the expanding beam 55 from the spatial filter assembly so that two beams diverge to a focus at lens 78. The kineform displayed on the LCD simultaneously diffracts and focuses the beam, in the same manner that the separate condenser lens 56 and LCD 68 did in the first embodiment. Conventional Kineforms are often binary, however the multi-level LCD is not constrained to a binary Kineform and is capable of displaying any of a number of diffracting patterns. In order to focus the light as a real image from the same location on the LCD to two different points on the camera lens 78, one must superimpose two grating structures at the LCD that each focus light but to two different points.

The Kineform at LCD 68 can also focus light directly to the final plate without use of an additional lens 78 at the correct angle. Unfortunately, the grating spatial frequencies recorded at the plate in such a configuration are the same or some low multiple of those displayed on the LCD and are generally too low to be useful as decorative gratings with presently available LCDs. However, usefulness of this configuration will increase as such higher resolution LCD's become available.

Those workers having ordinary skill in the art in light of the disclosure presented herein, will appreciate that depending upon the characteristics of the apparatus, such as the embodiments illustrated and described with respect to FIGS. 1, 10, 11, 12, and 13, that the data supplied along signal line 23 from computer 20 will be different depending upon the characteristics of the optical system and the desired output. In particular, it will be appreciated that the data communicated to LCD display 68 for the embodiment shown in FIG. 11 will include components to produce the desired Kineform focusing effect that would not otherwise be needed, for example in the embodiment illustrated in FIG. 1 where a separate condenser lens 56 is already provided. Data displayed on the LCD will be similar to that displayed in the system illustrated in FIG. 1 with the exception that fringes in the various regions of the image will be curved to focus the incoming light onto lens 78, and will generally have two sets of curved fringes superimposed to create the two beams necessary to create the final diffractive structure.

As has already been mentioned, the data sent to the LCD will depend upon the embodiment and the desired effect, but programming for any of the embodiments described need not be complex to be effective. Simple but visually dynamic images can be created from a fixed set of chosen angles of diffraction. It should be noted that since the final image will diffract into both plus and minus orders of diffraction, 180 discrete angles with one degree separations will, for example, diffract into a range of 360 degrees. The macroscopic appearance of such images can be designed in any of several commercially available art programs such as for example, Adobe Photoshop. Other workers in the field have noted the utility of designing and saving such data as designs in a palettized bitmap format, coding angles of diffraction as colors in the image file. Standard palette replacement and rotation techniques can then be used to preview on the computer screen the kinetic effect of tipping the final diffractive image to different angles. For embodiments where microscopic text or other graphics are added to each exposure footprint, separate files containing this data can be created which ideally are combined and maintain registration with the image data during the recording process.

Bitmap file formats are also convenient for storing the diffractive image data sent to the LCD in the preferred embodiment. The files should either be made large enough to cover the entire display area of the LCD or in images where only linear gratings are formed, smaller sections of diffractive image data can be tiled to create larger areas on the display, so long as the fringes can be kept in alignment. All or some portions of such image files are then used to compose the final data sent to the LCD, depending upon design. The LCD image data can be generated in a simple Basic routine or routines in any other programming language which calculates the sine of the offset into the scan line for each pixel, adjustments being made for the angle of inclination for the fringes in each file.

Computers used for either the programming, data generation, and interface with the LCD display including the LCD display controller may be any of the commonly available microprocessor based computers, such as those made by IBM, Apple, Sun, Digital Equipment corporation and the like. They typically incorporate 386, 486, 586, Pentium, PentiumPro, or equivalent or higher microprocessors.

Figure 12:
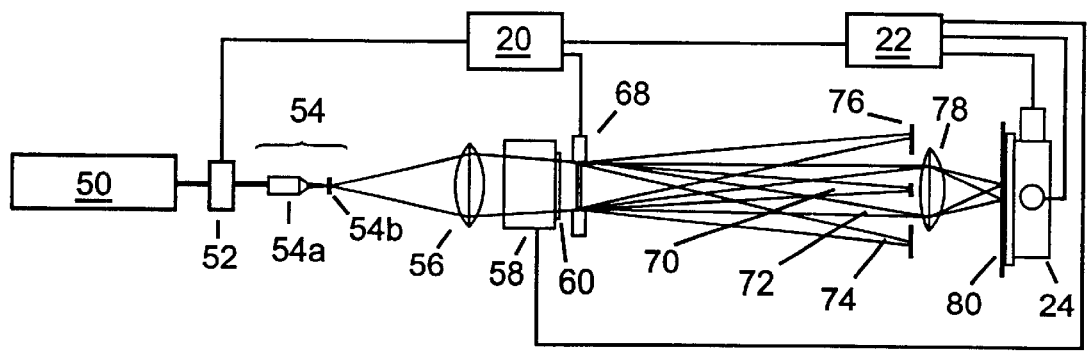
FIG. 12 is a diagrammatic illustration, somewhat schematic, showing a fourth embodiment having a rotary servo motor with mounted grating and means for expanding the beam to cover a large area on the grating.

The fourth embodiment illustrated in FIG. 12 has rotary servo 58 with mounted grating 60, and the inventive system includes means for expanding the beam to cover a large area on the grating 60 to go through a mask 76 and to focus the beam down to the camera lens 78. Conventional systems merely take a raw beam from the laser, direct it through a diffraction grating, and then spin or rotate the diffraction grating to make the beams move around on the camera lens 78. The lens 78 is referred to as a camera lens because a conventional camera lens is suitable for this purpose although a holographic optical element or many other conventional lens arrangements are equally suitable for this task. Lens 56 is referred to as a condenser lens because of it's functional purpose in the system, and need not be a conventional condenser type lens.

The inventive structure provides means for varying the information provided in the aperture of LCD 68, and provides the ability to alter the final fringe angles at will typically under computer contract via the servo, and provides additional features, such as recording text and graphic elements in each exposure. The inventive device also provides means for masking portions of each footprint and for changing shape of each footprint individually if desired. The advantages of this structure and method include the relative ease of programming the data sent to the LCD system, which includes only gross features of the final image relative to the fringe structure as no fringes need be generated or displayed by the LCD, which acts only as a mask in this embodiment.

Figure 13:
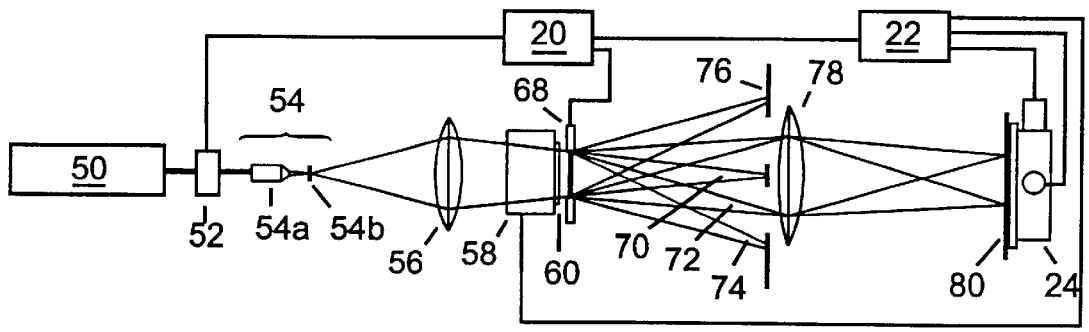
FIG. 13 is a diagrammatic illustration, somewhat schematic, showing a fifth embodiment of the invention similar with the embodiment already shown and described relative to the embodiment in FIG. 11 except that characteristics of some optical components and their placement in the optical path has been altered to achieve particular alternative advantages.

A fifth embodiment of the invention is illustrated in FIG. 13. This apparatus represents a modification of the embodiment already illustrated and described with respect to FIG. 11; however, the characteristics of some optical components and their placement in the optical path has been altered to achieve the particular benefits now described.

In this fifth embodiment there is a one-to-one correspondence between the pixels of the LCD and the pixels exposed in the final hologram. More particularly, condenser lens 56 is selected so as to intercept the expanding laser beam from spatial filter assembly 54, and to redirect that intercepted beam in a converging path to rotationally mounted diffraction grating 60. The diffraction grating 60 is rotatable to select particular angles of diffraction in the final image. This selection is accomplished by generating an image structure within LCD 68 by "opening" (e.g. making transparent) all the pixels in the footprint portion of the final image which are required by design to diffract at a first orientation and by aligning diffraction grating 68 to match that first orientation. In this matter, the photo receptive material 81 in focal plane 80 (or the footprint region) is exposed such that all information at one particular diffraction grating angle is exposed at the same time, and then during subsequent exposures other orientations are selected by rotating diffraction grating 60 to those other orientations, opening the regions of the LCD for which exposure to the other regions are desired, and exposing these other orientations. If an image larger than the focused size of the LCD on the final plate is required by the design of the final hologram, the plate is then moved using an X-Y transport to the next exposure region and the process is repeated until the entire image has been exposed.

Operation of this fifth embodiment also has some different characteristics from the operation of other embodiments already described. The magnification of lens 78 determines the area of exposure on the final plate and this can be as large or larger than the LCD itself, depending on the pitch desired in the final image. In operation, all of the pixels that one wants to expose at one diffraction grating angle are made transparent, the shutter 52 is opened, an exposure is made, the shutter is closed, the angular orientation for the rotatable grating is changed, and the same or different pixels where exposure at a different grating angle are desired are made transparent, and a subsequent exposure is made. If there are 180 different angles desired in the final image, then the procedure will expose the entire 640×480 LCD display swatch (or any portion thereof in 180 separate spatially overlapping or discrete exposures. No microscopic graphic or text data is possible in the final image, save that built from the gross pixel patterns displayed on the screen, but exposures of large areas of undifferentiated (save for angle) pixels can be created rapidly. For example, in the preceding example, conventional systems would require 640×480-, or 307,200 exposures for the same region this embodiment can expose in 180 exposures.

A computer simulation of a representative security device or security marking made in accordance with the invention is illustrated in FIGS. 14A–14E. FIG. 14 illustrates a section of printed currency 501. FIGS. 14B–14E illustrate progressively smaller sections of section 501 at greater magnification so that greater detail may be seen in particular regions of the currency. In FIG. 14D, a small portion 504 of the currency 501 is illustrated showing a background region 506 on which is recorded microtext 507. Other graphic or pictorial information either alone or in combination with text may be used. Of course where test is provided, it may be in any alphabet, symbol set, or the like.

With respect to FIG. 14E, there is shown a magnified portion 511 of the currency in FIG. 14D illustrating additional details of the microprinted text (or other graphic) that are preferably but optionally provided. Each of the rectangular regions (or partial rectangular regions) 512–520 represent a region corresponding to an LCD footprint.

As illustrated in FIG. 14E, each footprint may provide one or more regions having either no fringes (such as region 513) or may have a combination of regions having fringes at different angular orientations and/or different fringe spacings. For example, in one region 516 background fringes are oriented at a first angle (about 135 degrees in the drawing) with a spacing of $1/f_{B1}$ where $f_{B1}$ is the spatial frequency of the background fringes. Also illustrated is a second text region 522 having fringes at a second orientation relative to the first set of background fringes and a fringe spacing of $1/f_{T1}$ where $f_{T1}$ is the spatial frequency of the text fringes within the letter "E". These fringes will generally have alternating light and dark bands with a continuum of shades of grey of the character already illustrated in FIG. 4, that is they will not generally be the solid black and white lines illustrated in FIG. 14E. Those workers having ordinary skill in the art in light of this description will appreciate the characteristics exhibited by interference fringes.

It should also be appreciated from the enlarged view in FIG. 14E, that the rectangular regions 512–520 ideally appear as a continuum in the actual output (here the currency note) and that delineating the separate regions is merely for the sake of the description herein. In light of this, the "E" which appears in each of regions 516 and 518 is not divided by the boundary between these two regions. To the extent that some misalignment between LCD exposure footprints may be tolerated, the invention is not to be construed to cover only embodiments in which perfect footprint abutment is realized.

The fringes in the currency result in diffraction of light, the angle at which diffraction occurs being a function of the fringe spacing, the orientation of the fringes relative to the plate at the output plane, and the wavelength of incident light that is diffracted by the fringes. Therefore, as is well understood by those workers having ordinary skill in the art, the fringes will produce a rainbow effect so that for a polychromatic illumination (e.g. normal white light) different colors are directed at an observer's eye (or an instrument's sensor) from the various different spatial frequencies, and further the rainbow of colors will tend to roll as the currency note is moved or rotated past the eye of the observer. These diffractive elements provide the distinctive diffractive rainbow effect.

Use of such diffractive elements, imbedded micro-text or micro-graphics, and other features described herein does not preclude the inclusion of other distinctive features such as specially formulated and/or colored inks or dyes, magnetic encoding, papers or other substrates, watermarks, diffractive foils applied to the surface of the currency note, or combinations of these and other features. It is also understood that the example of a currency note is merely illustrative of the features that may be incorporated into a document or other item. The method and apparatus disclosed herein is more generally applicable to recording small features on a substrate where the small features requires or benefits from high spatial frequency information such as may be achieved by electromagnetic interference fringes at predefined locations in space.

While the present inventive structure and method has been described with reference to a few specific embodiments, the description is illustrative of the invention and is not to be construed as limiting the invention. Various modifications may occur to those skilled in the art without departing from the true spirit and scope of the invention as defined by the appended claims. All references cited herein are hereby incorporated by reference.

I claim:

1. In a method of making a document having an authentication element of the type including diffractive structures and non-diffractive structures substantially surrounded by said diffractive structures disposed thereupon, said method including a step of forming said diffractive structures and said non-diffractive structures in a common layer of material and characterized in that:

said forming said diffractive structures and said non-diffractive structures includes forming a plurality of micro-graphical features;

said forming of said micro-graphical features comprises forming a plurality of non-diffractive micro-graphical features embedded in a surround of diffractive structure;

said micro-graphical features are selected from the set of micro-graphical features consisting of alphabetic symbols or characters, numerical symbols or characters, and combinations thereof, said alphabetic symbols or characters and numerical symbols or characters being selected from members of any alphabet or symbol set; and said diffractive structures and said non-diffractive structures are formed substantially simultaneously in said common layer of material.

2. The method in claim 1, further characterized in that: said step of forming said diffractive structures and said non-diffractive structures includes forming said diffractive structures in regions to have a plurality of diffractive fringes, and forming said non-diffractive structures in other regions to be devoid of diffractive fringes.

3. The method in claim 1, further characterized in that: said step of forming said non-diffractive structures comprises forming non-diffractive micro-graphical features each having a zero-width perimeter defining a shape of said micro-graphical feature and an area interior to said perimeter devoid of diffractive elements.

4. The method in claim 1, further characterized in that said non-diffractive structures are formed by forming diffractive structures except in areas where non-diffractive structures are desired.

5. The method in claim 1, wherein said common layer of material is photosensitive.

6. The method in claim 5, wherein said photosensitive material comprises photographic film or photoresist material.

7. The method in claim 1, wherein said non-diffractive structures include at least one alpha-numerical character.

8. The method in claim 1, wherein said document is selected from the group consisting of: currency, an official document, a legal instrument, a financial instrument, a commercial instrument, a credit card, and article packaging.

9. The method in claim 1, wherein said non-diffractive structures comprise discernable feature components as small as six microns, and said diffractive structures having spacings as small as one micron.

10. The method in claim 1, wherein said step of forming said non-diffractive and diffractive structures includes generating a real image of a liquid crystal display at said common layer of material.

11. The method in claim 1, wherein said step of forming said diffractive structures and said non-diffractive structures includes:

displaying a two-dimensional data set as a pattern on a liquid crystal display having a diffractive region and a non-diffractive region;

illuminating said liquid crystal display with a converging beam of light;

forming said non-diffractive structures by imaging a real image representation of at least an outline of said non-diffractive region displayed on said display; and forming said diffractive structures by generating interference fringes from physical wave interference of light diffracted by said illuminating of said diffractive region of said liquid crystal display.

12. The method in claim 11, wherein said step of forming said diffractive structures and said non-diffractive structures further includes:

altering said two-dimensional dataset;

repositioning said common layer of material such that the location at which said non-diffractive and diffractive structures are formed is changed; and generating a composite image of a plurality of said non-diffractive and diffractive structures.

13. A method of making a document having an authentication element of the type including diffractive structures and non-diffractive structures substantially surrounded by said diffractive structures disposed thereupon formed thereupon, said method comprising:

forming said authenticating element covering at least a portion of an outer surface of a document substrate, said forming including forming a diffractive structure and a non-diffractive micro-graphical feature providing security information embedded within said diffractive structure and each of said diffractive structure and said non-diffractive feature being integrally formed substantially simultaneously within a single common layer of material;

said diffractive structure generating a visually perceptible color pattern which is dependent upon a direction of illumination and/or a direction of visual viewing;

said non-diffractive micro-graphical feature having a substantially constant visually perceptible appearance substantially independent of the direction of said illumination and/or said direction of visual viewing;

said forming of said micro-graphical features comprises forming a plurality of non-diffractive micro-graphical features embedded in a surround of diffractive structure, and said micro-graphical features selected from the set consisting of alphabetic symbols or characters, numerical symbols or characters, and combinations thereof, and wherein said alphabetic symbols or characters and numerical symbols or characters are selected from members of any alphabet or symbol set.

14. A method as in claim 13, wherein said document substrate comprises a paper substrate.

15. A method as in claim 13, wherein said document is selected from the group consisting of currency, a official document, a legal instrument, a financial instrument, a commercial instrument, a credit card, and article packaging including article packaging for items selected from the group consisting of software and art.

16. A method as in claim 13, wherein said forming of said micro-graphical feature comprises forming alpha-numeric text devoid of any diffraction fringes and having discernable feature components as small as six microns, and said diffractive fringe structures having spacings as small as one micron.

17. A method as in claim 13, wherein said micro-graphical feature has discernable feature components of substantially 6 micron.

18. A method as in claim 13, wherein said document substrate comprises a paper substrate.

19. A method as in claim 13, wherein said document substrate comprises a polymeric substrate.

20. A method as in claim 13, wherein said document is an item of currency.

21. A method of making currency having an authentication element of the type including diffractive structures and non-diffractive structures substantially surrounded by said diffractive structures disposed thereupon, said method including a step of forming said diffractive structures and said non-diffractive structures in a common layer of material and characterized in that:

said forming said diffractive structures and said non-diffractive structures includes forming a plurality of micro-graphical features;

said forming of said micro-graphical features comprises forming a plurality of non-diffractive micro-graphical features embedded in a surround of diffractive structure;

said micro-graphical features are selected from the set of micro-graphical features consisting of alphabetic symbols or characters, numerical symbols or characters, and combinations thereof, said alphabetic symbols or characters and numerical symbols or characters being selected from members of any alphabet or symbol set; and said diffractive structures and said non-diffractive structures are formed substantially simultaneously in said common layer of material.

22. A method as in claim 21, wherein said currency comprises a polymeric substrate.

23. The method in claim 22, wherein said authentication element is applied to said currency and said currency comprises a polymeric substrate.

24. The method in claim 22, wherein said authentication element is applied to said currency and said currency comprises a paper substrate.

* * * * *